US012761640B2

(12) United States Patent
Natsui et al.

(10) Patent No.: US 12,761,640 B2
(45) Date of Patent: Oct. 13, 2026

(54) MANUFACTURING DEVICE FOR PERSONAL CARE PRODUCT

(71) Applicant: Kao Corporation, Tokyo (JP)

(72) Inventors: Shohei Natsui, Tokyo (JP); Takahiro Hirano, Tokyo (JP); Tomoyuki Motegi, Tokyo (JP)

(73) Assignee: KAO CORPORATION, Tokyo (JP)

( * ) Notice: Subject to any disclaimer, the term of this patent is extended or adjusted under 35 U.S.C. 154(b) by 240 days.

(21) Appl. No.: 18/822,475

(22) Filed: Sep. 3, 2024

(65) Prior Publication Data

US 2024/0427319 A1 Dec. 26, 2024

Related U.S. Application Data

(63) Continuation of application No. PCT/JP2023/015568, filed on Apr. 19, 2023.

(30) Foreign Application Priority Data

Jun. 15, 2022 (JP) ................................ 2022-096368
Apr. 11, 2023 (JP) ................................ 2023-064347

(51) Int. Cl.
*G05B 19/418* (2006.01)
*B25J 9/16* (2006.01)

(52) U.S. Cl.
CPC ...... *G05B 19/41895* (2013.01); *B25J 9/1679* (2013.01)

(58) Field of Classification Search
CPC ...... G05B 2219/32254; G05B 2219/00; G05B 19/00; G05B 19/41895; B25J 9/1679;
(Continued)

(56) References Cited

U.S. PATENT DOCUMENTS 5,645,865 A * 7/1997 Schad .................. B29C 45/842
425/169
10,912,718 B2 2/2021 Perrin et al.
(Continued)

FOREIGN PATENT DOCUMENTS

CN 107392686 A 11/2017
JP 2005-526572 A 9/2005
(Continued)

OTHER PUBLICATIONS

International Search Report and Written Opinion mailed on Jul. 11, 2023, received for PCT Application No. PCT/JP2023/015568, filed on Apr. 19, 2023, 08 pages including English Translation.
(Continued)

*Primary Examiner* — William P Bartlett
(74) *Attorney, Agent, or Firm* — XSENSUS LLP

(57) ABSTRACT

A manufacturing device, apparatus, or system can comprise: a stage including a plurality of stations; a shuttle to mount a workpiece thereon and to move between a plurality of the stations to transport the workpiece; and a controller. The controller can control movement of the shuttle by moving the shuttle to a supply station to mount the workpiece thereon, extracting operation stations for performing operations for the mounted workpiece from a plurality of the operation stations, selecting an operation station from the plurality of the operation stations in accordance with availability of the extracted operation stations and reversibility of an execution order of the operations, and moving the shuttle to the selected operation stations in sequence to perform the operations on the workpiece, then moving the shuttle to an ejecting station to eject the workpiece, and then moving the shuttle to the supply station again.

18 Claims, 32 Drawing Sheets

(58) Field of Classification Search
CPC .. A45D 40/16; A61K 8/0216; A61K 2800/10; A61Q 19/00
See application file for complete search history.

(56) References Cited

U.S. PATENT DOCUMENTS

| | | | | |
|---|---|---|---|---|
| 10,969,764 | B2 | 4/2021 | Kobayashi et al. | |
| 11,295,254 | B2 * | 4/2022 | Muenz | G06Q 10/0631 |
| 2003/0225384 | A1 | 12/2003 | Zenker et al. | |
| 2009/0112350 | A1 * | 4/2009 | Yuan | G05B 19/41835 700/117 |
| 2016/0124434 | A1 | 5/2016 | Gariepy et al. | |
| 2018/0024518 | A1 | 1/2018 | Jin | |
| 2020/0319630 | A1 * | 10/2020 | Rudnitsky | G05B 19/41865 |
| 2021/0308918 | A1 * | 10/2021 | Niewels | B29C 45/0408 |
| 2021/0397178 | A1 | 12/2021 | Thomas et al. | |
| 2022/0084153 | A1 * | 3/2022 | Johnson | B65G 1/1373 |
| 2023/0219276 | A1 * | 7/2023 | Niewels | B29C 45/76 264/537 |
| 2024/0099943 | A1 * | 3/2024 | De Luigi | A45D 40/16 |
| 2024/0109191 | A1 * | 4/2024 | Aikens | B25J 9/1679 |

FOREIGN PATENT DOCUMENTS

| | | | |
|---|---|---|---|
| JP | 2017-518983 | A | 7/2017 |
| JP | 2019-016165 | A | 1/2019 |
| JP | 2019-108308 | A | 7/2019 |
| WO | 2018/178876 | A1 | 10/2018 |

OTHER PUBLICATIONS

Office Action mailed on Oct. 23, 2023, received for FR Application 2305533, 04 pages pages including English Translation.
Search Report mailed on Jan. 12, 2024, received for FR Application 2305533, 23 pages including English Translation.
Office Action mailed on Jun. 26, 2024, received for FR Application 2305533, 11 pages pages including English Translation.

* cited by examiner

MANUFACTURING DEVICE FOR PERSONAL CARE PRODUCT

CROSS-REFERENCE TO RELATED APPLICATION(S)

The present application is a continuation of International Application No. PCT/JP2023/015568, filed Apr. 19, 2023, which claims priority to Japanese priority application No. 2022-096368, filed Jun. 15, 2022, and Japanese Patent Application No. 2023-064347, filed Apr. 11, 2023, the entire content and disclosure of each is hereby incorporated by reference in entirety.

SUMMARY

According to one or more aspects of the present disclosure, a manufacturing system, apparatus, or device for manufacturing a personal care product applicable to one or more portions of a human body can be provided or implemented. The manufacturing system or device can comprise: a stage including a plurality of stations; a shuttle to mount a workpiece thereon and to move between a plurality of the stations to transport the workpiece, the workpiece being a precursor of the personal care product; and a controller, wherein the plurality of stations includes: a supply station to which the workpiece is supplied, a plurality of operation stations at which operations are respectively performed on the workpiece, and an ejecting station from which the workpiece is ejected, and the controller controls movement of the shuttle by moving the shuttle to the supply station to mount the workpiece thereon, extracting operation stations for performing operations to the mounted workpiece from among the plurality of operation stations, selecting an operation station from a plurality of the operation stations in accordance with availability of the extracted operation stations and reversibility of an execution order of the operations, and moving the shuttle to the selected operation stations in sequence to perform the operations on the workpiece, then moving the shuttle to the ejecting station to eject the workpiece, and then moving the shuttle to the supply station again.

DETAILED DESCRIPTION

The present disclosure relates to a manufacturing device or system for a personal care product, for instance, applicable to a human body including a face.

According to one or more embodiments of the present disclosure, it can be possible to achieve space-saving and manpower-saving in manufacturing of a personal care product including a plurality of processes and to shorten a cycle time.

Hereinafter, embodiments of the present disclosure will be described with reference to the drawings.

1. MANUFACTURING DEVICE, APPARATUS, OR SYSTEM

A manufacturing device, apparatus, or system 1 according to one or more embodiments of the present disclosure can be regarded as a manufacturing device for a personal care product 710, for instance, applicable to a human body including a face.

The personal care product 710 can be applicable to the human body by directly applying the personal care product 710 onto a skin or by applying, spraying, or dropping liquid, which can be obtained by dissolving or dispersing the personal care product 710 in a liquid medium such as water, onto the skin, for example. Further, the personal care product may be one that applies an aroma to the human body or may be, for example, an aroma candle that provides a relaxing effect to the human body via an aroma.

Such a personal care product 710 can include, for example, one kind or two or more kinds selected from a cosmetic, an aroma candle, a detergent, and a bath additive.

The cosmetic can include make-up cosmetics, basic cosmetics, perfumes, hair-care products, and the like. The detergent can include shampoos, framed soaps, solid soaps, and the like.

The make-up cosmetic can include solid cosmetics, such as eye shadows and foundations containing cosmetic powders and the like and lipsticks containing oils and the like.

The personal care product 710, according to one or more embodiments of the present disclosure, can be solid at one atmospheric pressure and at 20° C., for instance, from the viewpoint of allowing three-dimensional forming.

The manufacturing device 1 can manufacture a personal care product 710 by supplying one or two or more compositions constituting the personal care product 710 to a workpiece 700. The composition may have fluidity according to one or more embodiments of the present disclosure.

The composition having fluidity can be liquid itself or a composition containing liquid. In other words, the composition (or compositions) that may be used according to one or more embodiments of the present disclosure may exclude a solid-only form and/or gas-only form. Examples of such a composition can include a dispersion liquid (so-called slurry) that is a mixture containing powder such as a powder cosmetic and a liquid dispersion medium, a solution obtained by dissolving various compounds such as cosmetics in a liquid solvent, and a melting liquid obtained by heating and melting a cosmetic or oil alone, or a composition containing a cosmetic.

Figure 1:
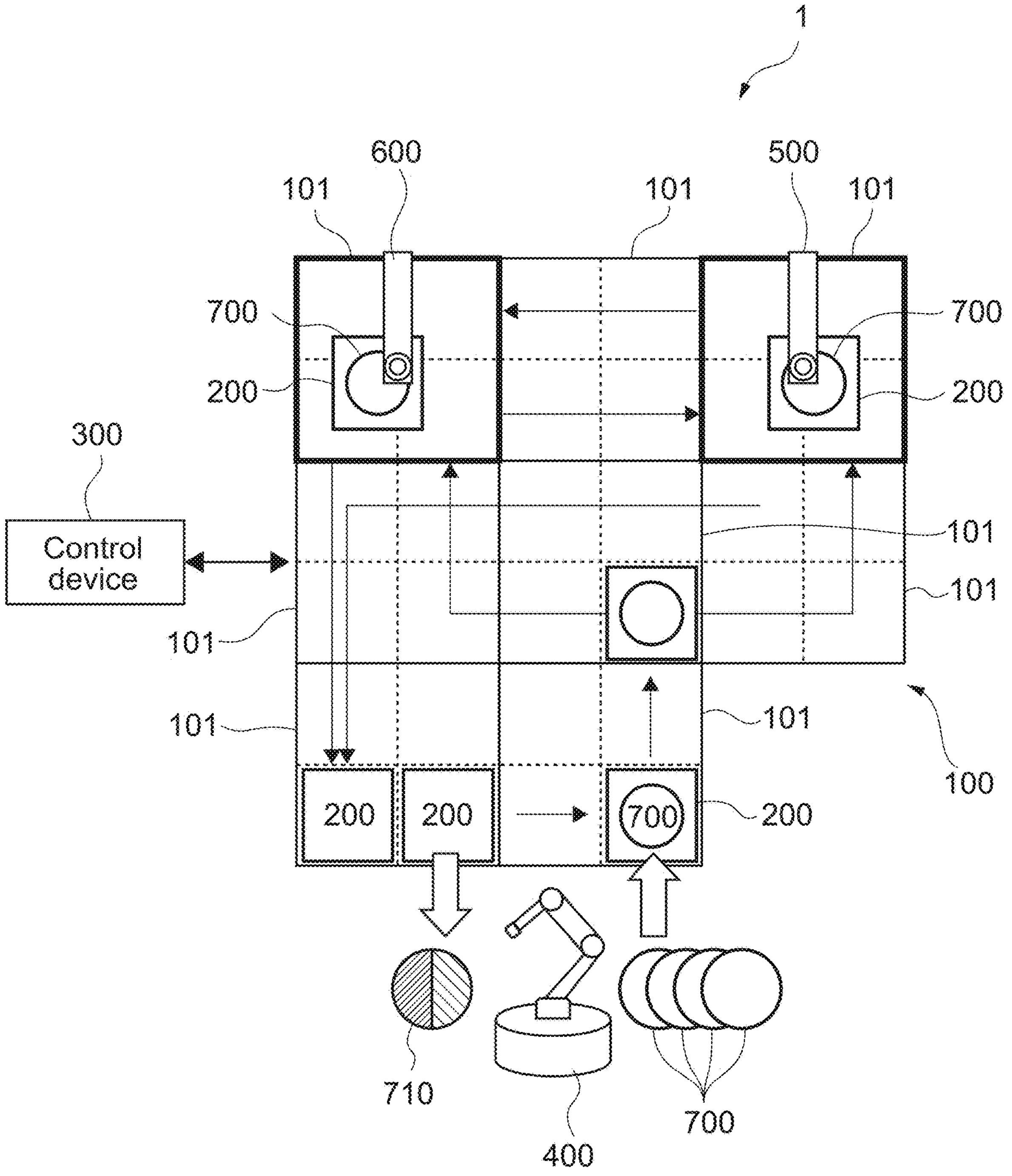
FIG. 1 shows a manufacturing device, apparatus, or system according to one or more embodiments of the present disclosure.

The manufacturing device 1 can include a stage 100, a plurality of shuttles 200, and a control device 300. The stage 100 and a plurality of the shuttles 200 may constitute a linear transport system (or portion thereof). The manufacturing device 1 may further include a manipulator robot 400, a first machine 500, and a second machine 600. FIG. 1 shows an example including those components according to one or more embodiments of the present disclosure.

Note that the stage 100 and the shuttles 200 in the manufacturing device 1 of the subject application can be a so-called "linear transport system."

Hereinafter, the linear transport system will be described. The linear transport system can be a magnetic floating linear transport system in which a transport plate (shuttle) including a permanent magnet can float above a table (segment) incorporating an electromagnetic coil and freely move. As compared to a conventional transport system capable of transport in one direction only, which may be typified by conveyor transport, in the linear transport system, individual shuttles can be capable of independently freely transporting workpieces, and thus the workpieces transported by the respective shuttles can also be capable of being subjected to different working processes in different transport paths.

The stage 100 can be constituted by combining a plurality of (e.g., eight) segments 101. Each segment 101 can be a physically independent table-like unit and can incorporate one or more electromagnetic coils. A plurality of the segments 101 may be disposed not in a serially linear manner but in a two-dimensional manner so as to be connected to each other to constitute the stage 100, according to one or more embodiments of the present disclosure.

Figure 2:
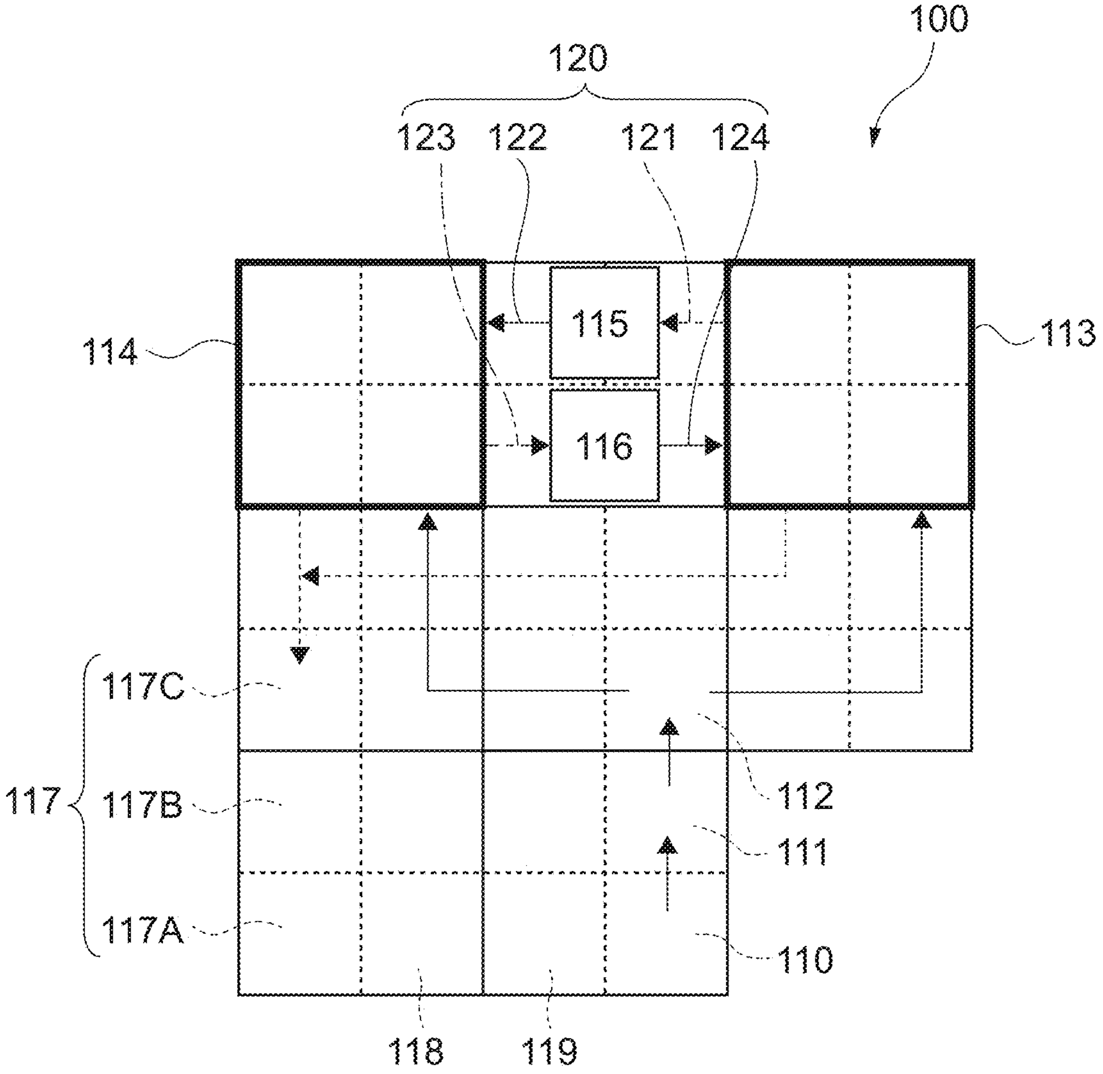
FIG. 2 shows a plurality of stations according to one or more embodiments of the present disclosure.

The stage 100 can include a plurality of stations 110 to 119. The plurality of stations 110 to 119 can be a plurality of areas obtained by virtually dividing the stage 100 in accordance with roles. Each of the stations 110 to 119 may be disposed within a corresponding segment 101 or may be disposed over adjacent segments 101. A plurality of (e.g., two to four) stations may be disposed in each segment 101 or one station may be disposed therein. The size of each of the stations 110 to 119 may be equal to or larger than the size of the shuttle 200. FIG. 2 shows an example of this arrangement according to one or more embodiments of the present disclosure.

Each shuttle 200 can include one or more permanent magnets. In a state in which on/off and current values of the electromagnetic coils of the stage 100 are controlled by the control device 300, the shuttle 200 can float upward from the stage 100 and be suspended over the stage 100, then can moves two-dimensionally over the stage 100. The shuttle 200 can mount a workpiece 700 thereon and can move between a plurality of the stations 110 to 119, thus transporting the workpiece 700 over the stage 100. The shuttle 200 may include a jig for positioning the mounted workpiece 700. Note that when the shuttle 200 is described as being "over the stage 100" or the like, it can mean that the shuttle 200 is not in contact with the stage 100 and is in the state floating with a slight gap away from the stage 100.

The workpiece 700 can be formed by filling a metal dish or a resin dish with a base material made of a composition constituting the personal care product 710. The base material can be, for example, pressed powder, that is, a pressed product obtained by compressing powder, such as foundation. Instead of the metal dish or the resin dish, the dish may be manufactured using paper, a film, a nonwoven fabric, or the like, as long as one or two or more compositions constituting the personal care product 710 can be supplied thereto.

In order to supply the workpieces 700 to the shuttles 200 over the stage 100 and eject the workpieces 700 from the shuttles 200 over the stage 100, the manipulator robot 400 may be used. A single manipulator robot 400 may supply and eject the workpieces 700. Alternatively, a single manipulator robot 400 may supply the workpieces 700, and another manipulator robot 400 may eject the workpieces 700.

The first machine 500 can perform a first operation on the workpiece 700 with the workpiece 700 being mounted on the shuttle 200. The second machine 600 can perform a second operation on the workpiece 700 with the workpiece 700 being mounted on the shuttle 200. The second operation can be different from the first operation in whole or in part. The first operation and/or the second operation can be operations for applying decoration to the base material of the workpiece 700. Performing operations with the workpiece 700 being mounted on the shuttle 200 can mean that it may be unnecessary to relocate the workpiece 700 from the shuttle 200 to an XY stage or the like. Since there may be no need for a device that performs relocation or alignment and a time required therefor, it can be possible to prevent the facility from expanding and to shorten the cycle time.

The order of performing the first operation and the order of performing the second operation may be exchangeable. For example, an operation of supplying a composition to a workpiece and an operation of performing press-working on the supplied composition may not be exchangeable in the order of performing those operations. In contrast to this, the order of performing an operation of supplying one composition (e.g., red composition) to a workpiece 700 to apply decoration to the workpiece 700 and the order of performing an operation of supplying another composition (e.g., blue composition) to a workpiece 700 to apply decoration to the workpiece 700 may be exchangeable. As another example, such orders are exchangeable in the case where drawing can be performed at two locations, but may not be exchangeable, for instance, in the case where a recess portion is provided using a deposition or by carving and is then filled with a deposit in a subsequent process. The time taken for the first operation and the time taken for the second operation may be different from each other or may be the same.

The first operation performed by the first machine 500 can include a process of creating a first sculpture having a first shape and applying decoration to the base material of the workpiece 700. The second operation performed by the second machine 600 can include a process of creating a second sculpture having a second shape and applying decoration to the base material of the workpiece 700. The composition forming the first sculpture and the composition forming the second sculpture can be different from each other, but may be the same. The first shape and the second shape can be different from each other, but may be the same, according to one or more embodiments of the present disclosure.

Optionally, the composition forming the first sculpture and the composition forming the second sculpture can be different from each other, which may mean that the compositions are different in color, for instance. For example, that can mean that the composition forming the first sculpture is a red composition, and the composition forming the second sculpture is a blue composition.

Optionally, the first shape and the second shape can be different from each other, which can mean that the first sculpture and the second sculpture are different in design, for instance. For example, this can mean that the first shape has a star-shaped design, and the second shape has a flower-shaped design. The design may be, for example, various characters such as Japanese characters including hiragana and katakana, alphabets, Arabic numerals, Roman numerals, and foreign characters; straight lines and curves, and figures and geometric shapes formed of combinations thereof; and symbols, colors, patterns, or combined shapes thereof.

The first machine 500 can be a dispenser that can include a first nozzle for supplying a composition.

The first machine 500 can perform a first sculpture forming process. Specifically, the first machine 500 can be controlled to move at least one of the first nozzle and/or the workpiece 700 mounted on the shuttle 200 relative to the other one to deposit a composition on the base material of the workpiece 700. At that time, this process can be performed while supplying the composition to the workpiece 700 from the first nozzle, with the workpiece 700 being mounted on the shuttle 200.

The first shape of the first sculpture can be formed by a first deposition, which can be formed of the composition supplied from the first nozzle. In other words, the first machine 500 can apply decoration to the base material of the workpiece 700 using the composition, not by simply supplying the composition but by creating the first sculpture having the first shape.

Instead of the above, the first machine 500 may include a first carving machine. Examples of the carving machine can include an end mill, a drill, and a milling cutter.

The first machine 500 may perform, as the first sculpture forming process, decoration by carving the base material or the like of the workpiece 700 to form a first carving while moving at least one of the first carving machine and/or the workpiece 700 relative to the other one, with the workpiece 700 being mounted on the shuttle 200. The first shape of the first sculpture can be formed by the first carving.

The second machine 600 is preferably a dispenser including a second nozzle for supplying a composition.

The second machine 600 can perform a second sculpture forming process. Specifically, the second machine 600 can move at least one of the second nozzle or the workpiece 700 mounted on the shuttle 200 relative to the other one to deposit a composition on the base material of the workpiece 700. At that time, this process can be performed while supplying the composition to the workpiece 700 from the second nozzle, with the workpiece 700 being mounted on the shuttle 200.

The second shape of the second sculpture can be formed by a second deposition, which can be formed of the composition supplied from the second nozzle. In other words, the second machine 600 can apply decoration to the base material of the workpiece 700 using the composition, not by simply supplying the composition but by creating the second sculpture having the second shape.

Instead of the above, the second machine 600 may include a second carving machine. Examples of the carving machine can include an end mill, a drill, and a milling cutter.

The second machine 600 may perform, as the second sculpture forming process, decoration by carving the base material or the like of the workpiece 700 to form a second carving while moving at least one of the second carving machine or the workpiece 700 relative to the other one, with the workpiece 700, to which the composition has been supplied, being mounted on the shuttle 200. The second shape of the second sculpture can be formed by the second carving.

In the manufacturing device 1, the first machine 500 may form the first deposition, and the second machine 600 may form the second deposition.

The first machine 500 may form the first carving, and the second machine 600 may form the second carving.

The first machine 500 may form the first deposition, and the second machine 600 may form the second carving.

The first machine 500 may form the first carving, and the second machine 600 may form the second deposition.

The process of forming the first deposition by the first machine 500 may include a process of filling a metal dish or a recess portion formed by a deposition or carving with the composition.

The process of forming the second deposition by the second machine 600 may include a process of filling a metal dish or a recess portion formed by a deposition or carving with the composition.

In the personal care product 710 manufactured according to one or more embodiments of the present disclosure, the first sculpture may include the first deposition, and the second sculpture may include the second deposition.

The first sculpture may include the first carving, and the second sculpture may include the second carving.

The first sculpture may include the first deposition, and the second sculpture may include the second carving.

The first sculpture may include the first carving, and the second sculpture may include the second deposition.

According to one or more embodiments, the control device 300 can control the manufacturing device 1 by the CPU that loads a computer program recorded on the ROM to the RAM and executes the computer program. The manufacturing device according to one or more embodiments of the present disclosure can include the stage 100, the manipulator robot 400, the first machine 500, and the second machine 600. The control device 300 can execute the computer program to control the on/off and the current values of the electromagnetic coils of the stage 100 and move the shuttles 200.

The control device 300 can control the first machine 500 and the second machine 600, for instance, on the basis of NC programs using G-codes as a subroutine of the above basic computer program. The on/off of the first machine 500 and the second machine 600 can be controlled by the G-codes according to one or more embodiments of the present disclosure. The control device 300 can control the first machine 500 to execute any of a plurality of different first operations, and can control the second machine 600 to execute any of a plurality of different second operations. For example, the control device 300 can cause the first machine 500 to create a first sculpture having a different shape (to execute any of different first operations) on the basis of a different NC program. The control device 300 can cause the second machine 600 to create a second sculpture having a different shape (to execute any of different second operations) on the basis of a different NC program. Note that if the first machine 500 and the second machine 600 are fixed and the shuttles 200 are moved relative to the first machine 500 and the second machine 600, the control device 300 can control the stage 100 to move the shuttles 200.

The control device 300 can execute a manufacturing method for a personal care product applicable to the human body. The manufacturing method for a personal care product may include two or more sculpture forming processes. The workpiece to be subjected to the sculpture forming processes can be a precursor of a personal care product. The sculpture forming processes can be for carving a workpiece including a base material therein or depositing a composition on the workpiece to form the base material as a sculpture. The two or more sculpture forming processes may include at least one of a process of forming a carving on the workpiece 700 and/or a process of forming a deposition on the workpiece 700. More specifically, the two or more sculpture forming processes may include at least one of: a process of carving the base material in the workpiece 700 while moving at least one of the carving machine and/or the workpiece 700 relative to the other one, to form a carving as a sculpture; or a process of moving, while supplying a composition for deposit from a nozzle to the workpiece 700, at least one of the nozzle and/or the workpiece 700 relative to the other one and depositing the composition for deposit on the base material, to form a deposition forming a three-dimensionally pattern as a sculpture. In each of the carving forming process and the deposition forming process, a base material coordinate system can be set, in which a plane parallel to the stage is the XY plane, and any point on the base material surface can be the origin. In each sculpture forming process, a local coordinate system can be set, in which a tip of the carving machine or the nozzle (operating machine) can be the origin on a plane parallel to the XY plane. In the carving forming process, after at least one of the carving machine and/or the workpiece 700 can be moved relative to the other one such that the origin of the local coordinate system and the origin of the base material coordinate system coincide with each other, the NC program can be operated in the local coordinate system to form a carving as a sculpture. In the deposition forming process, after at least one of the nozzle (operating machine) and/or the workpiece 700 is moved relative to the other one such that the origin of the local coordinate system and the origin of the base material coordinate system coincide with each other, the NC program can be operated in the local coordinate system to form a carving as a sculpture.

2. PLURALITY OF STATIONS

The stage 100, according to one or more embodiments of the present disclosure, can include a plurality of stations. A plurality of the stations 110 to 119 can include a supply station 110, a standby station 111, a third operation standby station 112, a first operation station 113, a second operation station 114, a first operation standby station 115, a second operation standby station 116, a plurality of ejecting standby stations 117, an ejecting station 118, and a supply standby station 119. FIG. 2 shows an example of those stations according to one or more embodiments of the present disclosure.

In the stage 100, areas other than a plurality of the stations 110 to 119 may be used as paths 120 between a plurality of the stations.

A plurality of the stations 110 to 119 can be disposed not in a serially linear manner but in a two-dimensional manner, for instance, so as to be capable of freely moving. Specifically, the first operation station 113, the second operation station 114, the supply station 110, and the ejecting station 118 can be disposed in a two-dimensional manner, for instance, such that a plurality of straight lines connecting the first operation station 113 and the second operation station 114 with the supply station 110 and the ejecting station 118 intersect with a straight line connecting the first operation station 113 and the second operation station 114.

In the supply station 110, a workpiece 700 can be mounted on an empty shuttle 200 by the manipulator robot 400.

In the standby station 111, the shuttle 200 on which the workpiece 700 can be mounted at the supply station 110 may be controlled to wait, for instance, so as to move from the supply station 110 to the third operation standby station 112.

In the third operation standby station 112, the shuttle 200, on which the workpiece 700 can be mounted and which has started from the station 110, may be controlled to wait, for instance, so as to move to the first operation station 113 or the second operation station 114.

In the first operation station 113, typically, the first machine 500 can be installed. In the first operation station 113, the first machine 500 can perform the first operation on the workpiece 700 with the workpiece 700 being mounted on the shuttle 200.

In the second operation station 114, the second machine 600 can be installed. In the second operation station 114, the second machine 600 can perform the second operation on the workpiece 700 with the workpiece 700 being mounted on the shuttle 200.

In the first operation standby station 115, a shuttle 200 that moves from the first operation station 113 to the second operation station 114 can be controlled to wait.

In the second operation standby station 116, a shuttle 200 that moves from the second operation station 114 to the first operation station 113 can be controlled to wait.

A plurality of the ejecting standby stations 117 can include a first ejecting standby station 117A, a second ejecting standby station 117B, and a third ejecting standby station 117C continuously disposed, for instance. The first ejecting standby station 117A can be disposed immediately before the ejecting station 118. The second ejecting standby station 117B can be disposed immediately before the first ejecting standby station 117A. The third ejecting standby station 117C can be disposed immediately before the second ejecting standby station 117B. In a plurality of the ejecting standby stations 117, shuttles 200, on which the workpieces 700 having been subjected to the operations to be the personal care products 710 can be mounted, can be controlled to wait, for instance, so as to move to the ejecting station 118.

In the ejecting station 118, the workpiece 700 that can be regarded as the personal care product 710 can be ejected from the shuttle 200 by the manipulator robot 400, for instance, so that the shuttle 200 is made empty.

In the supply standby station 119, the empty shuttle 200 from which the workpiece 700 has been ejected at the ejecting station 118 can be controlled to wait, for instance, so as to move to the supply station 110.

3. MANUFACTURING METHOD

The manufacturing method for a personal care product according to one or more embodiments, for instance created using the manufacturing device 1, will be described.

In this embodiment, description will be given on a case where two kinds of compositions are supplied to workpieces 700 mounted on first to fifth shuttles 201 to 205, and a plurality of personal care products having the same type are manufactured.

The control device 300 can control the movement of the shuttle 200 by moving the shuttle 200 to the supply station 110 to mount the workpiece 700 thereon, extracting the operation stations 113 and 114 for performing operations necessary for the mounted workpiece 700 from a plurality of the operation stations 113 and 114, selecting an optimal operation station 113, 114 from a plurality of the operation stations 113 and 114 in accordance with availability of the extracted operation stations 113 and 114 and reversibility of an execution order of the operations, and moving the shuttle 200 to the selected operation stations 113 and 114 in sequence, for instance, to perform the operation on the workpiece 700, then move the shuttle 200 to the ejecting station 118 to eject the workpiece 700, and then move the shuttle 200 to the supply station 110 again.

FIGS. 4 to 31 show an example of a case where the first to fifth shuttles 201 to 205 serving as five shuttles 200 are provided as the plurality of shuttles over the stage 100.

The control device 300 can control the first to fifth shuttles 201 to 205 to move independently between a plurality of the stations 110 to 119. Specifically, the control device 300 can perform control for performing the first operation and the second operation on the workpieces 700 mounted on the first to fifth shuttles 201 to 205 in parallel at the first operation station 113 and the second operation station 114.

More specifically, one workpiece 700 mounted on one shuttle of the first to fifth shuttles 201 to 205 can be subjected to the first operation at the first operation station 113. In parallel with this, another workpiece 700 mounted on another shuttle of the first to fifth shuttles 201 to 205 can be subjected to the second operation at the second operation station 114. Subsequently, the one workpiece 700 mounted on the one shuttle can be subjected to the second operation at the second operation station 114. In parallel with this, the other workpiece 700 mounted on the other shuttle can be subjected to the first operation at the first operation station 113. In order to achieve those operations, the control device 300 can control the movement of a plurality of the first to fifth shuttles 201 to 205.

Figure 3:
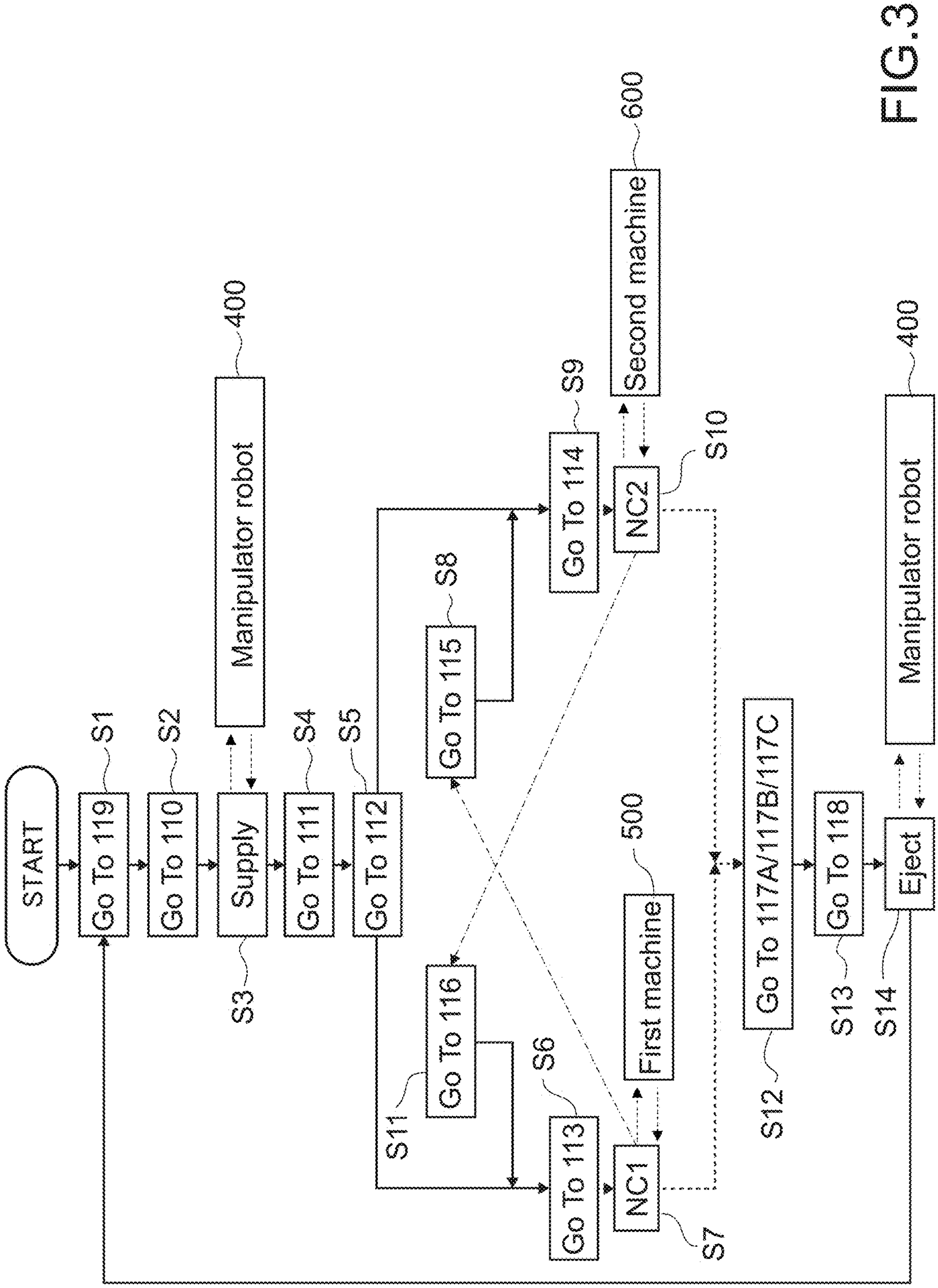
FIG. 3 is a flowchart showing a manufacturing method according to one or more embodiments of the present disclosure.

FIG. 3 is a flowchart showing an example of a manufacturing method according to one or more embodiments of the present disclosure.

When activated, the control device 300 can move the first to fifth shuttles 201 to 205 over the stage 100, for instance, to the initial positions. A user (operator or the like) may use an HMI to input information, such as the type or the number of personal care products to be manufactured by the manufacturing device 1, into the control device 300. The control device 300 can input a variable for achieving the input information into a computer program and can execute the computer program, thus performing (e.g., starting) the operation for manufacturing the personal care products according to one or more embodiments of the present disclosure.

The following is a specific example of the operation.

Figure 4:
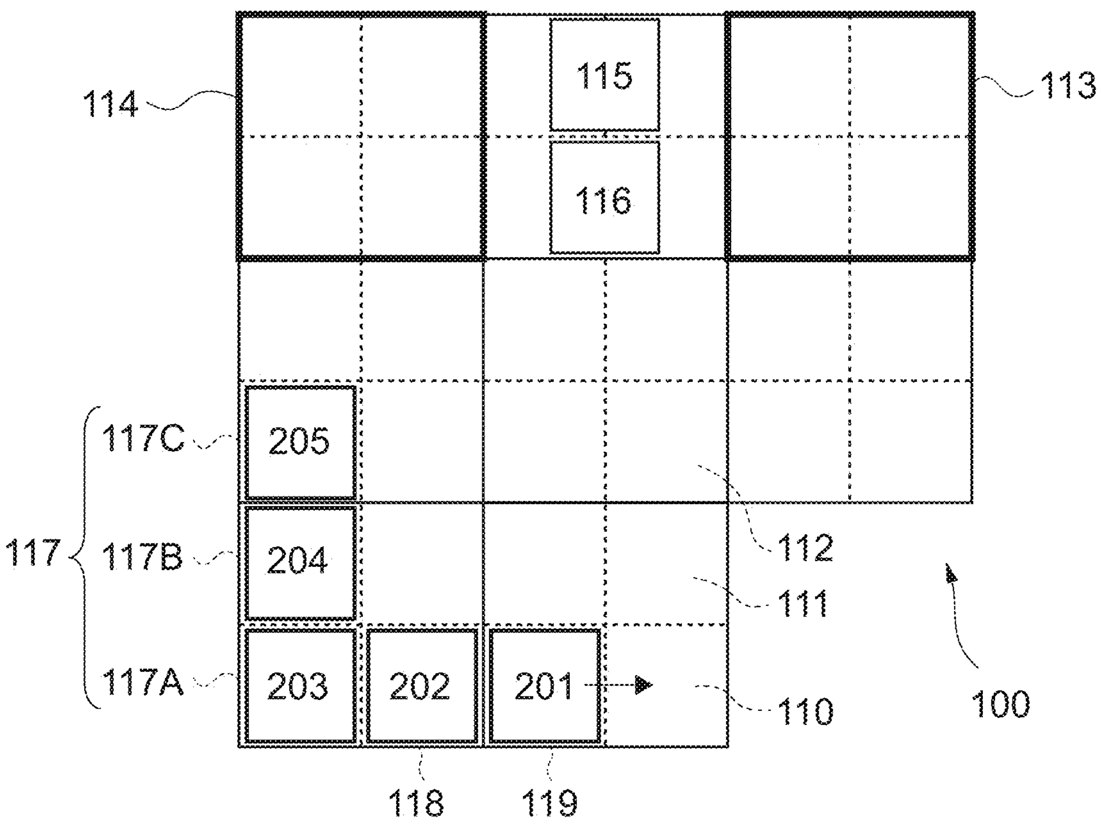
FIG. 4 shows an initial arrangement of a plurality of shuttles according to one or more embodiments of the present disclosure.

FIG. 4 shows the initial arrangement of a plurality of the shuttles according to one or more embodiments of the present disclosure.

The control device 300 can initially arrange the first shuttle 201 as a head in the supply standby station 119 (Step S1). The control device 300 can initially arrange the second to fifth shuttles 202 to 205 in sequence, for instance, so as not to interfere with the moving direction of the first shuttle 201, with the first shuttle 201 as a head.

In other words, the control device 300 can initially arrange the first shuttle 201 in the supply standby station 119. The control device 300 can initially arrange the second shuttle 202 in the ejecting station 118. The control device 300 can initially arrange the third shuttle 203 in the first ejecting standby station 117A. The control device 300 can initially arrange the fourth shuttle 204 in the second ejecting standby station 117B. The control device 300 can initially arrange the fifth shuttle 205 in the third ejecting standby station 117C.

The first to fifth shuttles 201 to 205 may be empty, and the workpieces 700 may not be mounted thereon.

The stage 100 incorporating the electromagnetic coils electromagnetically can detect the shuttles 200. The control device 300 can determine the stations 110 to 119, at which the shuttles 200 are located, on the basis of a result obtained when the stage 100 electromagnetically detects the shuttles 200.

When one shuttle 200 starts to move from departure stations 110 to 119 to destination stations 110 to 119, the control device 300 can determine that the destination stations 110 to 119 are in use. The control device 300 then can control another shuttle 200 so as not to start to move to the destination stations 110 to 119 determined to be in use.

When one shuttle 200 completes the movement from the departure stations 110 to 119 to the destination stations 110 to 119, the control device 300 can determine that the departure stations 110 to 119 are empty. The control device 300 can then control another shuttle 200 to start to move to the departure stations 110 to 119 determined to be empty.

This is because a plurality of the shuttles 200 can be prevented from colliding with each other.

Hereinafter, the movement of the first to fifth shuttles 201 to 205 according to one or more embodiments of the present disclosure can be subdivided to be shown in FIGS. 5 to 30, and described sequentially.

As long as the first to fifth shuttles 201 to 205 do not collide with each other, the operations shown in FIGS. 5 to 30 may be performed simultaneously and concurrently, according to one or more embodiments of the present disclosure. As long as there is no inconsistency, the operations shown in FIGS. 5 to 30 may be performed in the order in which some of the operations are reversed from one another, rather than in the order shown in the figures and the order of the explanations. For example, the operation described with reference to FIG. 6 may not be started subsequently after the operation described with reference to FIG. 5 is completed.

Further, the first to fifth shuttles 201 to 205 to be described with reference to the respective figures can be move independently, and simultaneously and concurrently, rather than move in sequence, according to one or more embodiments of the present disclosure. For example, when the movement of the first to fifth shuttles 201 to 205 is described with reference to FIG. 5, the second to fifth shuttles 202 to 205 may not be stationary while the first shuttle 201 is moving. As long as the first to fifth shuttles 201 to 205 do not collide with each other, the first to fifth shuttles 201 to 205 can move independently, and simultaneously and concurrently, according to one or more embodiments of the present disclosure.

Figure 5:
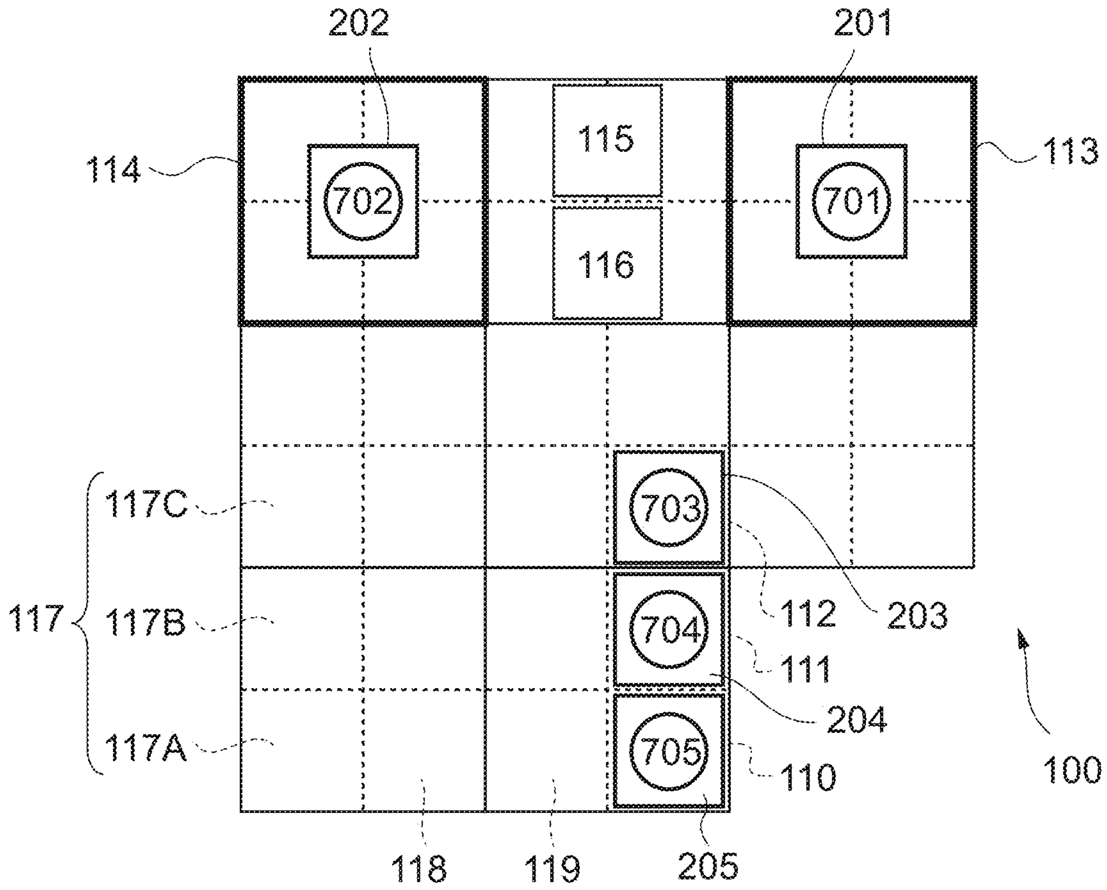
FIG. 5 shows a movement of a plurality of shuttles according to one or more embodiments of the present disclosure.

As shown in FIG. 5, the control device 300 can move the first shuttle 201 to the supply station 110 (Step S2) and can control the manipulator robot 400 to mount a workpiece 701 on the first shuttle 201 (Step S3). The control device 300 can move the first shuttle 201 to the standby station 111 (Step S4), to the third operation standby station 112 (Step S5), and to the first operation station 113 in sequence (Step S6).

When detecting an increase in weight of the shuttle 200 located at the supply station 110, the control device 300 can determine that the workpiece 701 is supplied to the shuttle 200. The control device 300 can then start control for moving the shuttle 200 to the first operation station 113 or the second operation station 114.

In parallel with the movement of the first shuttle 201, the control device 300 can move the second shuttle 202 to the supply station 110 (Step S2). The control device 300 can then control the manipulator robot 400 to mount a workpiece 702 on the second shuttle 202 (Step S3).

When detecting an increase in weight of the second shuttles 202, the control device 300 can move the second shuttle 202 to the standby station 111 (Step S4), to the third operation standby station 112 (Step S5), and to the second operation station 114 in sequence (Step S9).

In such a manner, the first shuttle 201 on which the workpiece 701 is mounted can be disposed in the first operation station 113. In parallel to this, the second shuttle 202 on which the workpiece 702 is mounted can be disposed in the second operation station 114.

In parallel with the movement of the first shuttle 201 and the second shuttle 202, the control device 300 can mount a workpiece 703 on the third shuttle 203 and can move the third shuttle 203 to the third operation standby station 112 (Steps S1 to S5).

The control device 300 can mount a workpiece 704 on the fourth shuttle 204 and can move the fourth shuttle 204 to the standby station 111 (Steps S1 to S4).

The control device 300 can move the fifth shuttle 205 to the supply station 110 and mounts a workpiece 705 thereon (Steps S1 to S3).

Figure 6:
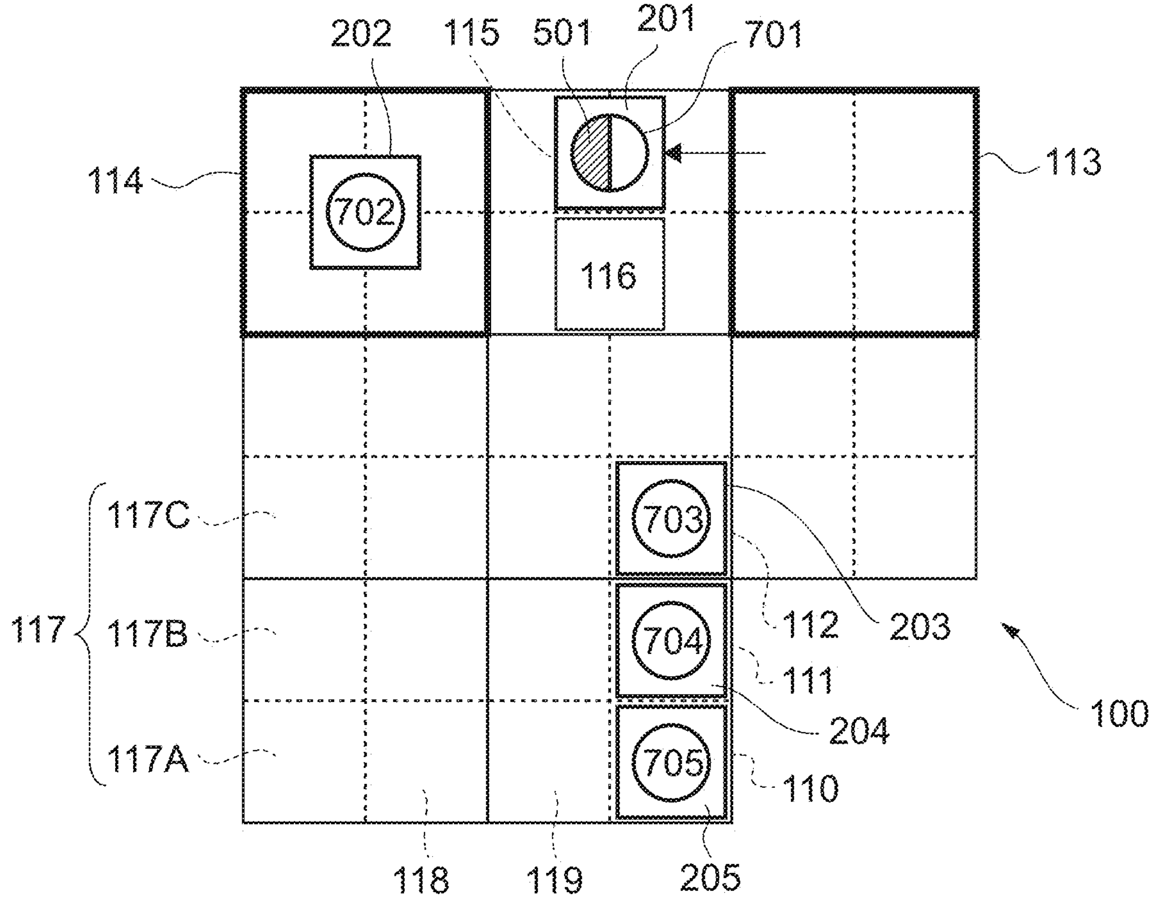
FIG. 6 shows a movement of a plurality of shuttles according to one or more embodiments of the present disclosure.

As shown in FIG. 6, for instance, the control device 300 can control the first machine 500 to perform the first operation on the workpiece 701 mounted on the first shuttle 201 located at the first operation station 113 (Step S7). By the first operation, a first decoration 501 can be applied to the workpiece 701.

The control device 300 can move the first shuttle 201 to the first operation standby station 115 (Step S8). As a result, the first operation station 113 can become empty.

Figure 7:
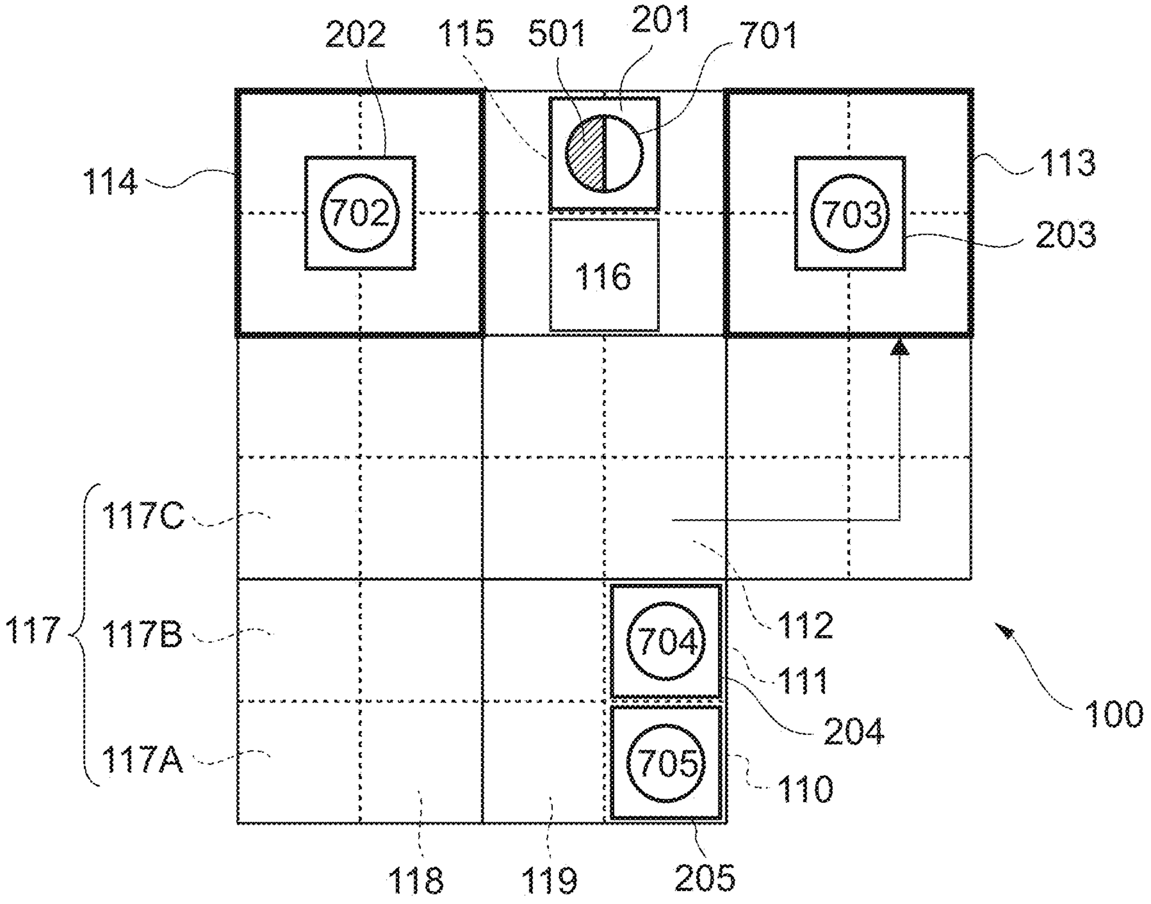
FIG. 7 shows a movement of a plurality of shuttles according to one or more embodiments of the present disclosure.

As shown in FIG. 7, for instance, the control device 300 can move the third shuttle 203 from the third operation standby station 112 to the first operation station 113 (Step S6). As a result, the third operation standby station 112 can become empty.

Figure 8:
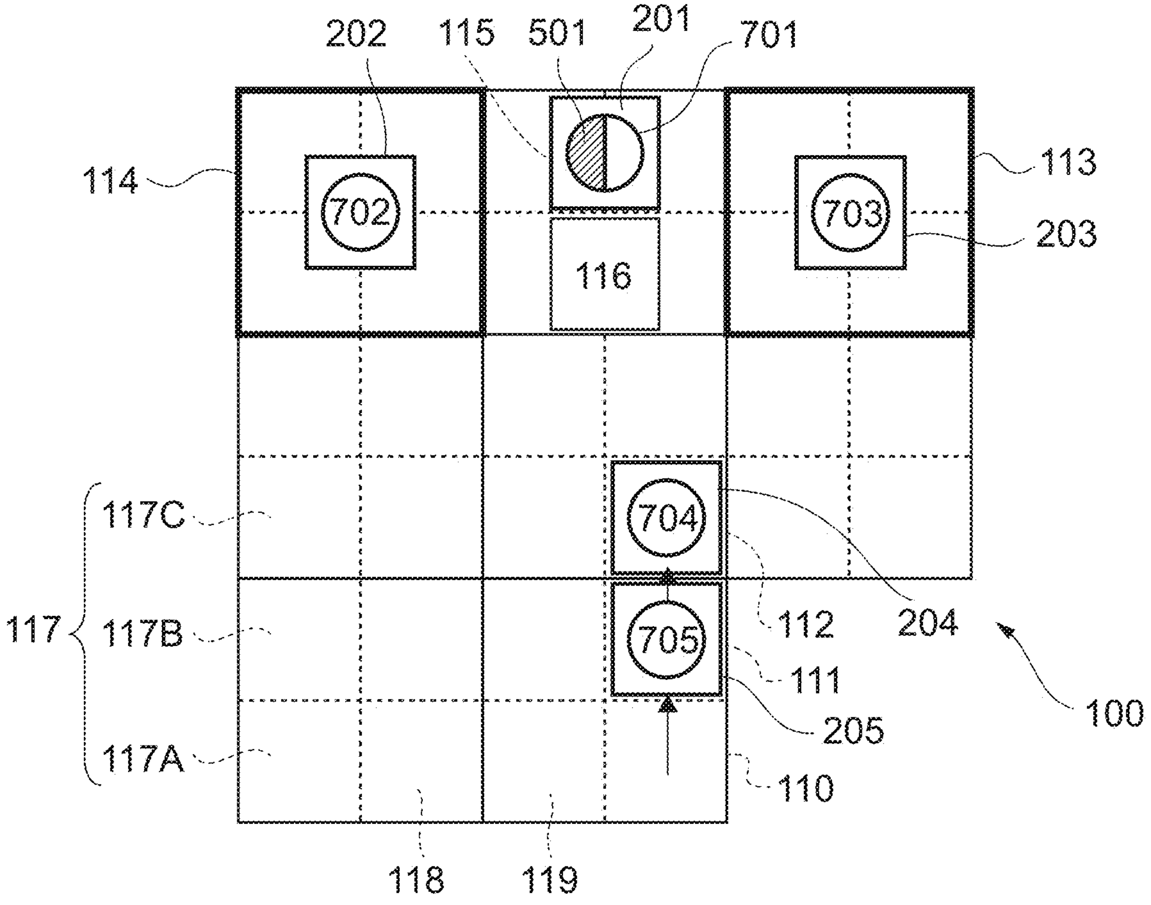
FIG. 8 shows a movement of a plurality of shuttles according to one or more embodiments of the present disclosure.
Figure 9:
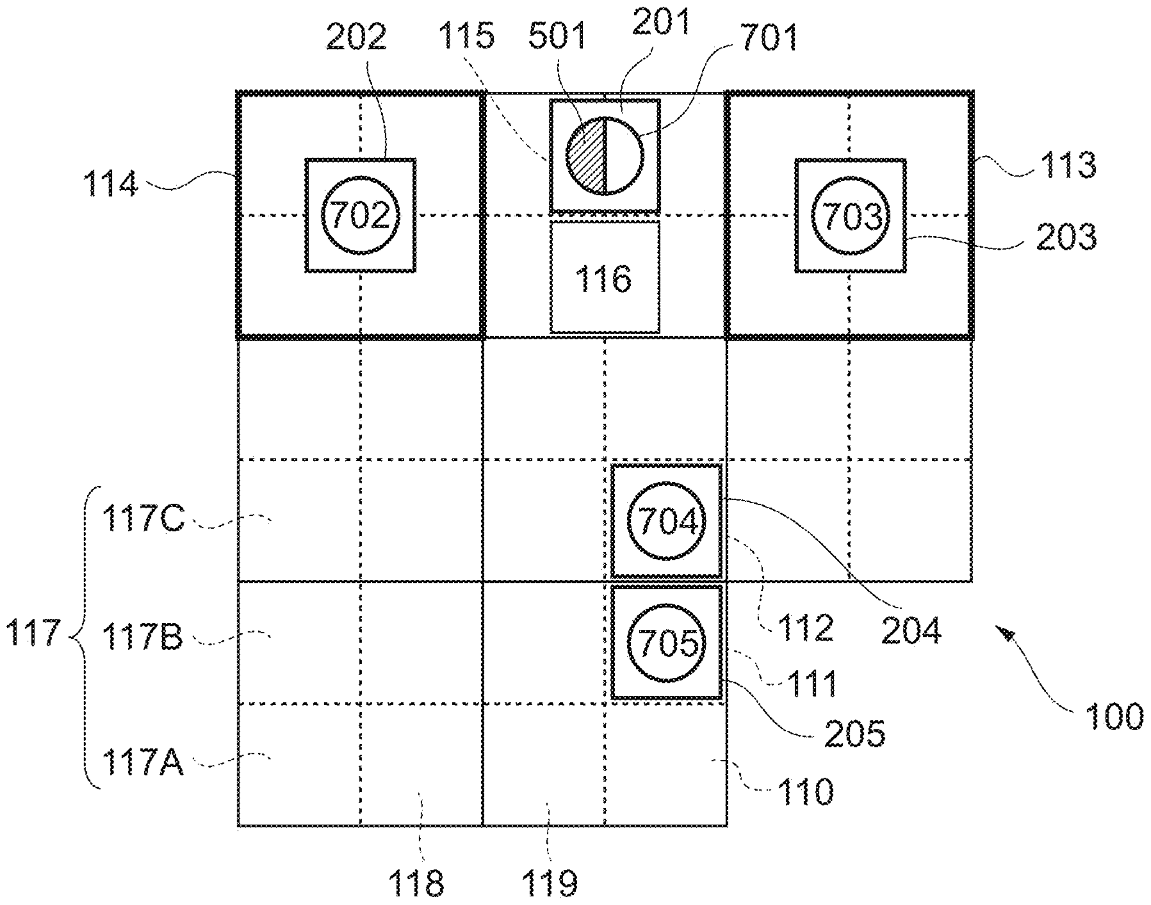
FIG. 9 shows a movement of a plurality of shuttles according to one or more embodiments of the present disclosure.

As shown in FIGS. 8 and 9, for instance, the control device 300 can move the fourth shuttle 204 from the standby station 111 to the third operation standby station 112 (Step S5). The control device 300 can move the fifth shuttle 205 from the supply station 110 to the standby station 111 (Step S4).

Figure 10:
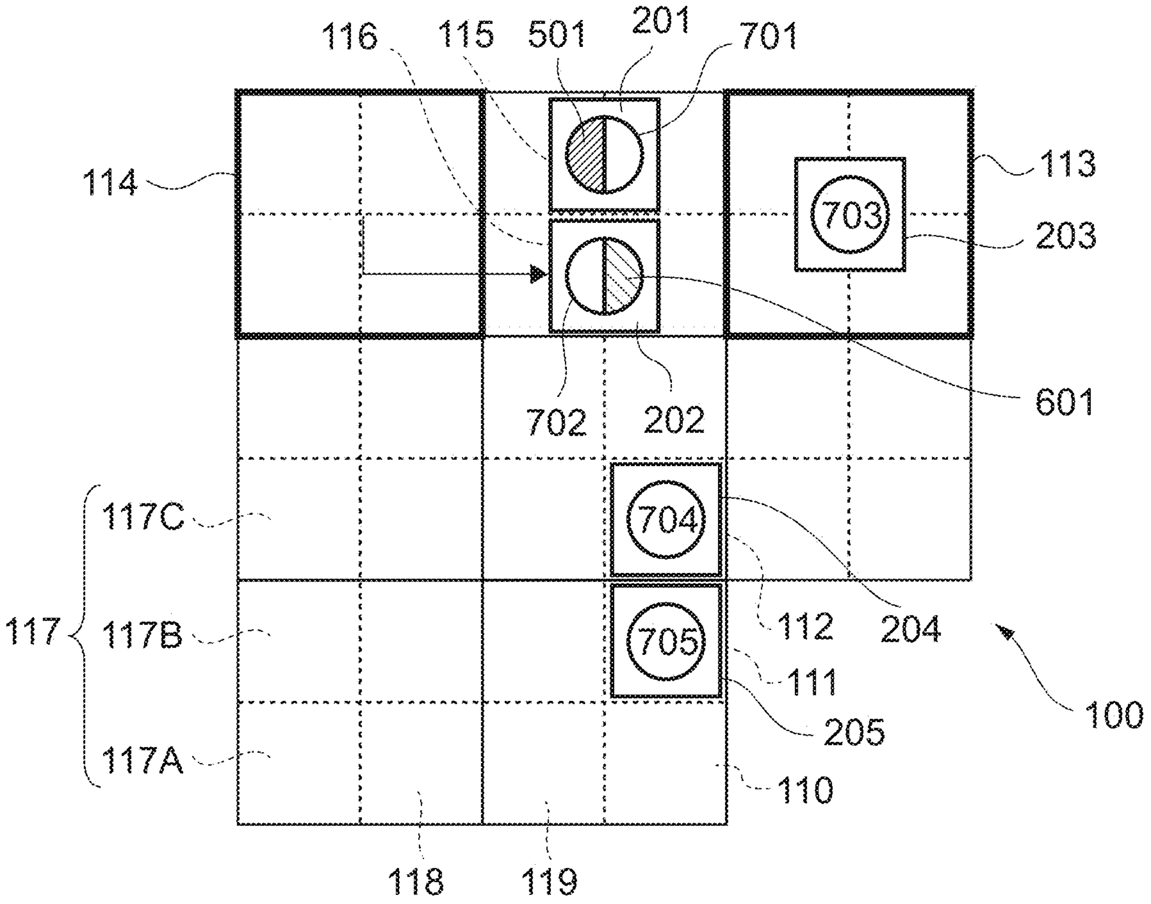
FIG. 10 shows a movement of a plurality of shuttles according to one or more embodiments of the present disclosure.

As shown in FIG. 10, for instance, the control device 300 can control the second machine 600 to perform the second operation on the workpiece 702 mounted on the second shuttle 202 located at the second operation station 114 (Step S10). By the second operation, a second decoration 601 can be applied to the workpiece 702.

The control device 300 can move the second shuttle 202 to the second operation standby station 116 (Step S11). As a result, the second operation station 114 can become empty.

The control device 300 can perform control such that the following paths become one-way paths: a path 121 from the first operation station 113 to the first operation standby station 115; a path 122 from the first operation standby station 115 to the second operation station 114; a path 123 from the second operation station 114 to the second operation standby station 116; and/or a path 124 from the second operation standby station 116 to the first operation station 113. This can be because a plurality of the shuttles 200 can be prevented from colliding with each other. In addition, this can be because the simultaneous movement in both directions can shorten the cycle time.

The path 123 from the second operation station 114 to the second operation standby station 116 will be described as an example.

As shown in FIG. 31(A), for instance, a path 123' from the second operation station 114 to the second operation standby station 116 may be one straight line having the shortest distance. In this case, the path of the shuttle 200 moving to the second operation standby station 116 can differ depending on the position within the second operation station 114 (the position of the shuttle 200 when the second operation is terminated).

At that time, from the viewpoint of reliably avoiding a collision with another shuttle 200 located at the first operation standby station 115, the path 123 from the second operation station 114 to the second operation standby station 116 may be not one straight line having the shortest distance but, for instance, an L-shaped path 123 made of two orthogonal straight lines of a right triangle including the above-mentioned one straight line as the oblique side.

Specifically, as shown in FIG. 31(B), for instance, after the second operation is terminated, first, the shuttle 200 can move to the center of the second operation station 114. Next, the shuttle 200 can move from the center of the second operation station 114 to the same position as the second operation standby station 116 in one direction (horizontal direction in the figure). Next, the shuttle 200 can move toward the second operation standby station 116 in the one direction.

Figure 11:
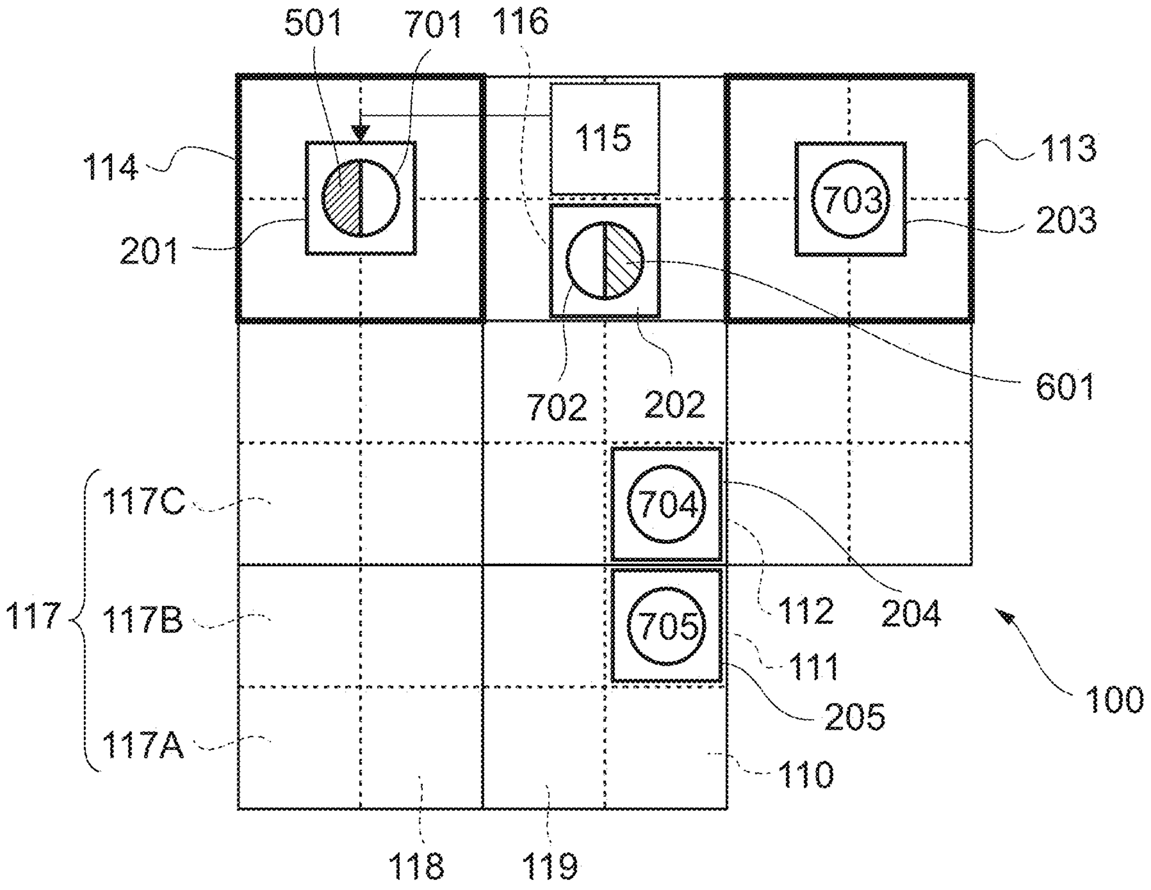
FIG. 11 shows a movement of a plurality of shuttles according to one or more embodiments of the present disclosure.

Return to the description of the flowchart. As shown in FIG. 11, for instance, the control device 300 can move the first shuttle 201 from the first operation standby station 115 to the second operation station 114 (Step S9). As a result, the first operation standby station 115 can become empty.

Figure 12:
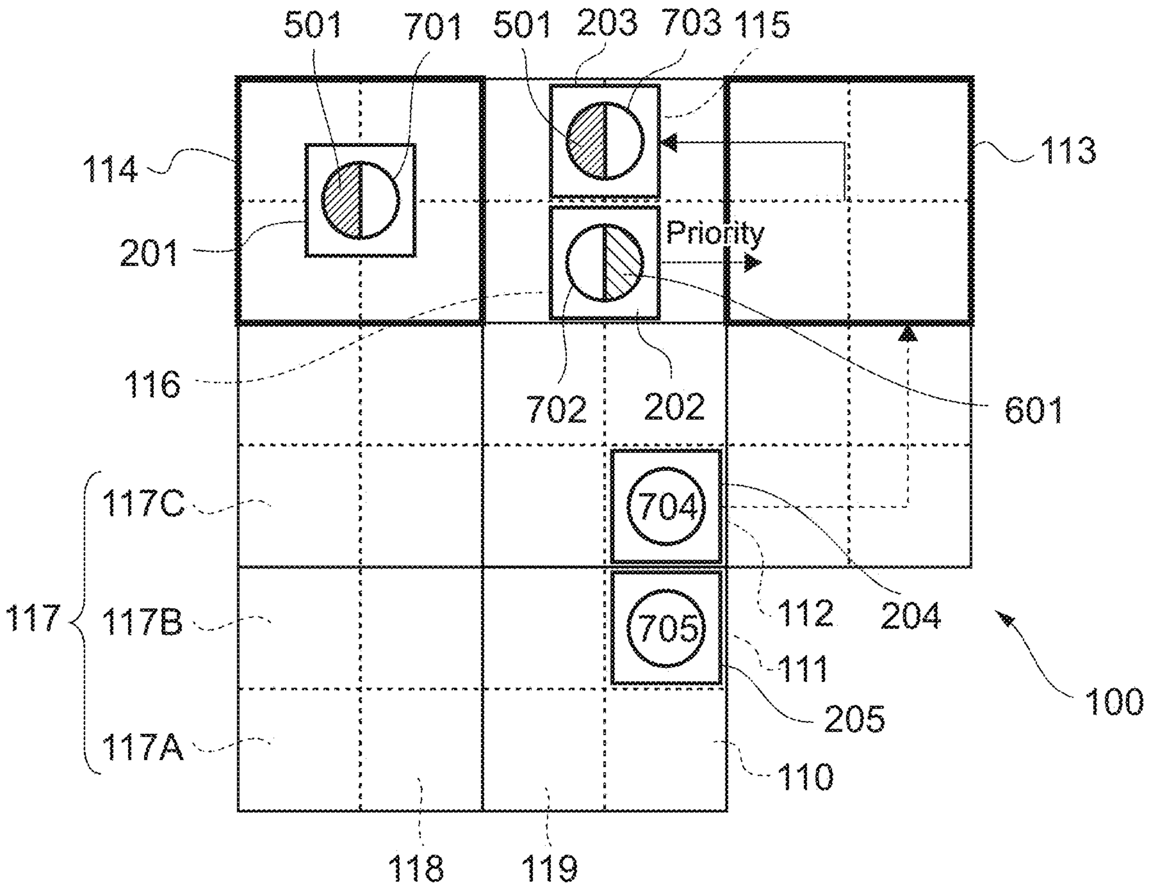
FIG. 12 shows a movement of a plurality of shuttles according to one or more embodiments of the present disclosure.

As shown in FIG. 12, for instance, the control device 300 can control the first machine 500 to perform the first operation on the workpiece 703 mounted on the third shuttle 203 located at the first operation station 113 (Step S7). By the first operation, the first decoration 501 can be applied to the workpiece 703.

The control device 300 can move the third shuttle 203 to the first operation standby station 115 (Step S8). As a result, the first operation station 113 can become empty.

According to one or more embodiments, the control device 300 can control the movement of a plurality of the shuttles 200, for instance, so as to shorten a moving time from the supply station 110 to the ejecting station 118. Specifically, the control device 300 can perform control for moving a shuttle 200, which has been supplied to the supply station 110 first, to the ejecting station 118 first. This can make it possible to shorten the time taken for manufacturing individual personal care products.

More specifically, it can be assumed in the control device 300 that the shuttles 200 are located at the first operation standby station 115 or second operation standby station 116 and the third operation standby station 112, and have the same destination station (first operation station 113 or second operation station 114). At that time, the movement of a plurality of the shuttles 200 can be controlled such that the shuttle located at the first operation standby station 115 or the second operation standby station 116 moves to the destination station (first operation station 113 or second operation station 114) first.

In other words, in the movement from the first operation standby station 115 to the second operation station 114 and the movement from the third operation standby station 112 to the second operation station 114, the control device 300 can perform the former movement. In the movement from the second operation standby station 116 to the first operation station 113 and the movement from the third operation standby station 112 to the first operation station 113, the control device 300 can perform the former movement.

In short, when both the first operation standby station 115 and the second operation standby station 116 are empty, the movement from the third operation standby station 112 to the first operation station 113 or the second operation station 114 can be performed. When the second operation station 114 and the first operation standby station 115 are occupied, and the first operation station 113 and the second operation standby station 116 are empty, the movement from the third operation standby station 112 to the first operation station 113 can be performed. This can be because the overall cycle time can be shortened by ejecting the shuttle 200 first, on which the workpiece 700 already subjected to the operation is mounted. The "overall cycle time" in this disclosure is not intended to be a cycle time when a single personal care product is manufactured, but intended to be a cycle time when many personal care products (that may include many types of personal care products) are manufactured. For example, a plurality of the shuttles 200 can freely move over the stage 100, specifically, a plurality of the shuttles 200 can move from the first operation station 113 to the second operation standby station 116 and from the second operation standby station 116 to the first operation station 113. Thus, the target operation can be performed simultaneously and concurrently, and hence the stagnation of the operation may be less likely to occur, unlike a serial line, for instance. Consequently, the overall cycle time when many personal care products 710 are manufactured can be shortened.

When the first operation station 113 and the second operation station 114, and the first operation standby station 115 and the second operation standby station 116 are all empty, the control device 300 can perform the movement from the third operation standby station 112 to the first operation standby station 115 over the movement from the third operation standby station 112 to the second operation station 114. This can be because the second operation station 114 is closer to the ejecting station, and thus the movement distance can be shortened more in the order of the third operation standby station 112, the first operation station 113, the second operation station 114, and the ejecting standby stations 117 than in the order of the third operation standby station 112, the second operation station 114, the first operation station 113, and the ejecting standby stations 117. Further, this can be because a plurality of the shuttles 200 can be prevented from colliding with each other by determining rules.

According to one or more embodiments, it can be assumed that the second shuttle 202 located at the second operation standby station 116 and the fourth shuttle 204 located at the third operation standby station 112 are both destined for the first operation station 113. In this case, the control device 300 can perform control for moving the second shuttle 202, which has been supplied to the supply station 110 first, to the ejecting station 118 first.

Figure 13:
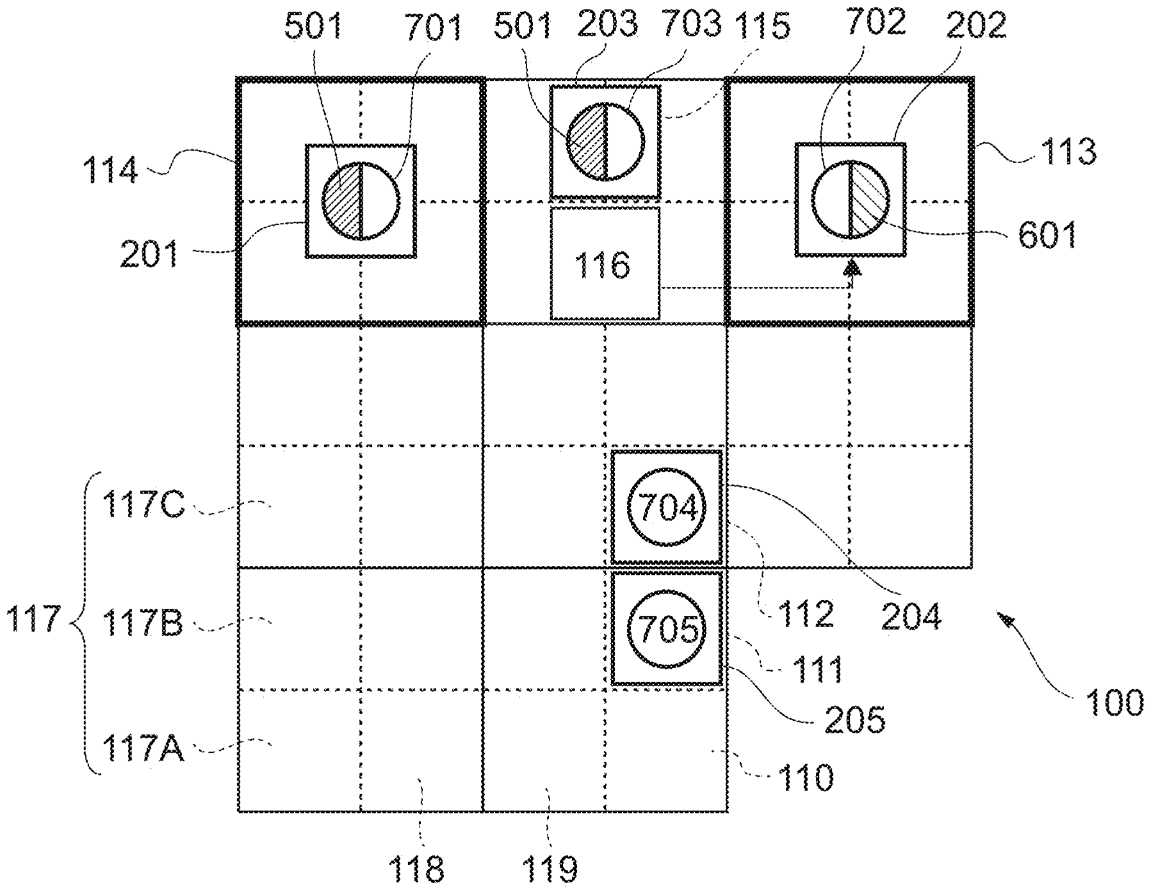
FIG. 13 shows a movement of a plurality of shuttles according to one or more embodiments of the present disclosure.

As shown in FIG. 13, for instance, the control device 300 can move the second shuttle 202 from the second operation standby station 116 to the first operation station 113 (Step S6). As a result, the second operation standby station 116 can become empty.

Figure 14:
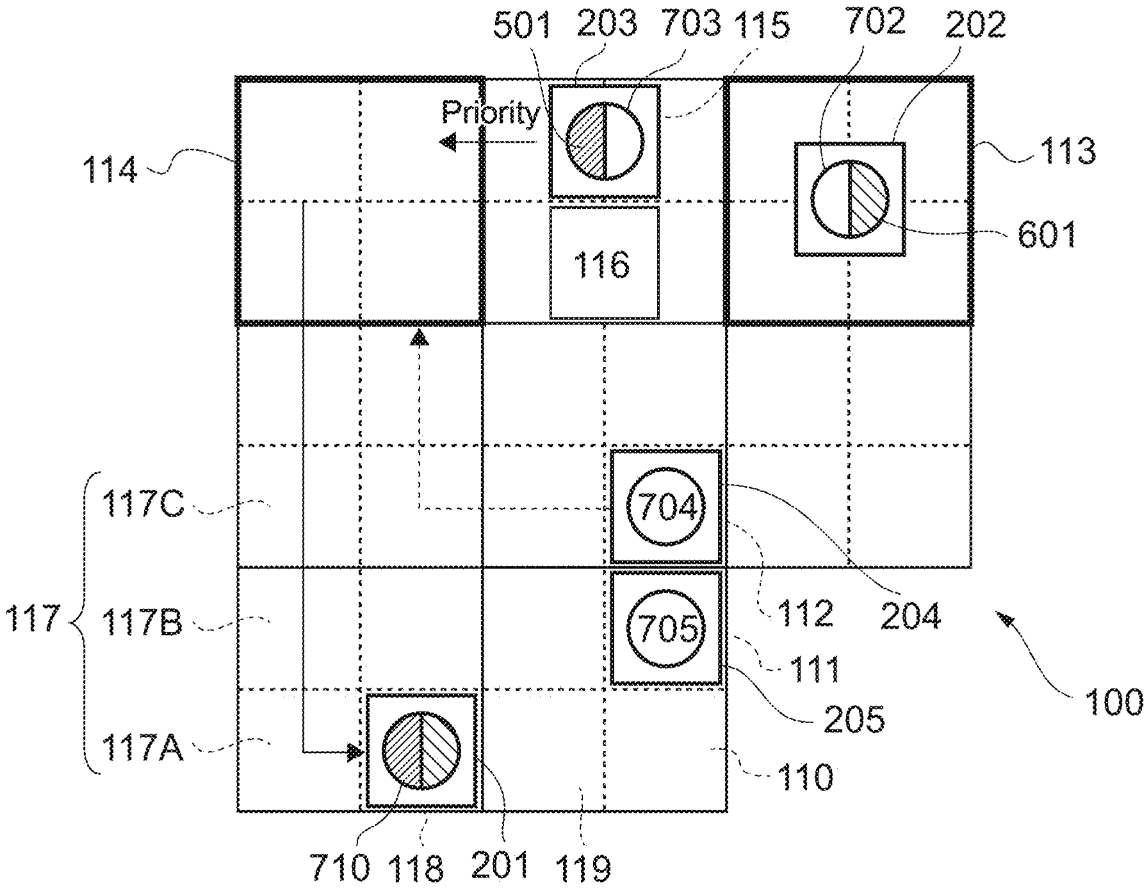
FIG. 14 shows a movement of a plurality of shuttles according to one or more embodiments of the present disclosure.

As shown in FIG. 14, for instance, the control device 300 can control the second machine 600 to perform the second operation on the workpiece 701 (on which the first operation has been already performed) mounted on the first shuttle 201 located at the second operation station 114 (Step S10). By the second operation, the second decoration 601 can be applied to the workpiece 701.

The control device 300 can move the first shuttle 201 from the second operation station 114 to the third ejecting standby station 117C, the second ejecting standby station 117B, and the first ejecting standby station 117A in this order (Step S12) and can move the first shuttle 201 to the ejecting station 118 (Step S13).

When the first shuttle 201 arrives at the ejecting station 118, the control device 300 can determine that all the operations for the workpiece 701 mounted on the first shuttle 201 are terminated and the workpiece 701 is or can be made into a finished product of the personal care product 710.

According to one or more embodiments, it can be assumed that the third shuttle 203 located at the first operation standby station 115 and the fourth shuttle 204 located at the third operation standby station 112 are both destined for the second operation station 114. In this case, the control device 300 can perform control for moving the third shuttle 203, which has been supplied to the supply station 110 first, to the ejecting station 118 first.

Figure 15:
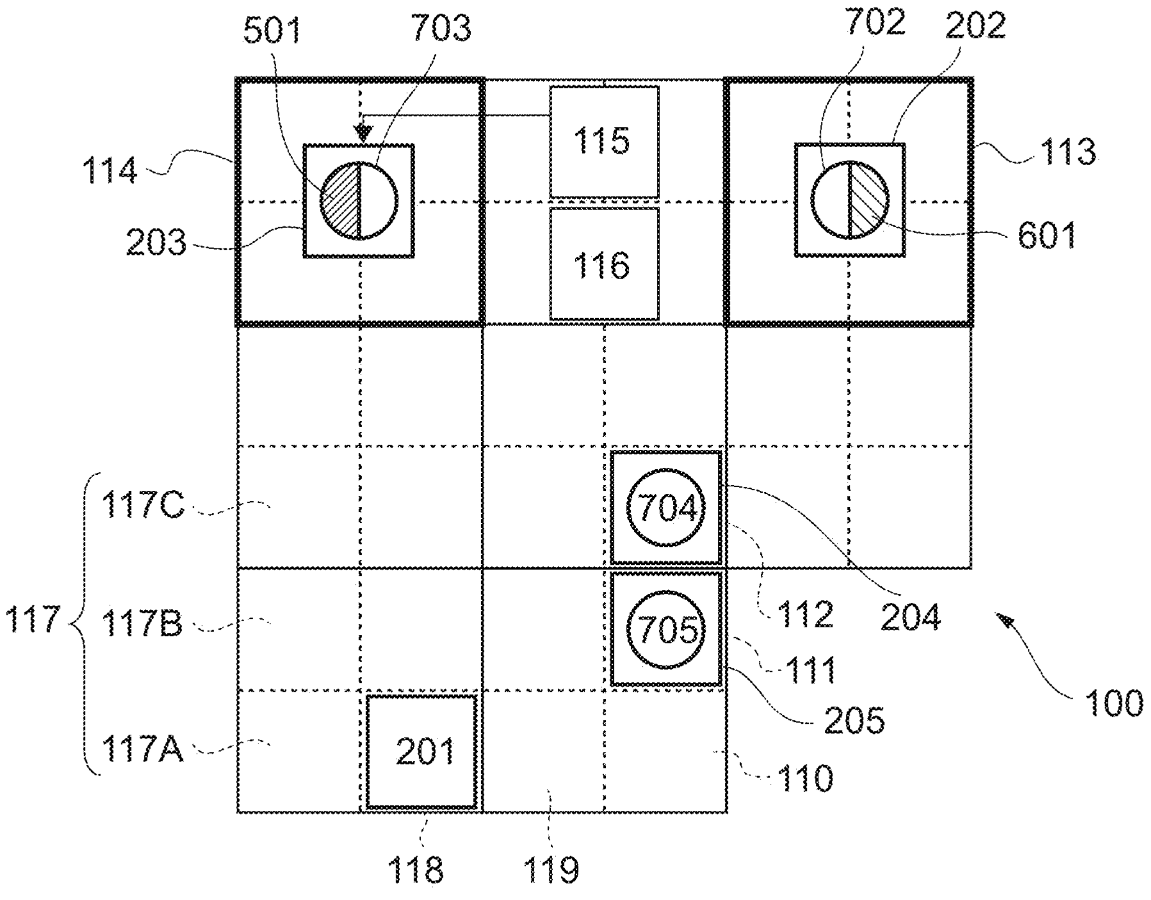
FIG. 15 shows a movement of a plurality of shuttles according to one or more embodiments of the present disclosure.

As shown in FIG. 15, for instance, the control device 300 can move the third shuttle 203 from the first operation standby station 115 to the second operation station 114 (Step S9). As a result, the first operation standby station 115 can become empty.

The control device 300 can control the manipulator robot 400 to eject the workpiece 701 from the first shuttle 201 located at the ejecting station 118 (Step S14).

When detecting a decrease in weight of the shuttle 200 located at the ejecting station 118, the control device 300 can determine that the workpiece 701 is ejected from the first shuttle 201. The control device 300 may then delete the running program for controlling the first shuttle 201 and can newly start control for moving the first shuttle 201 to the supply station 110.

Figure 16:
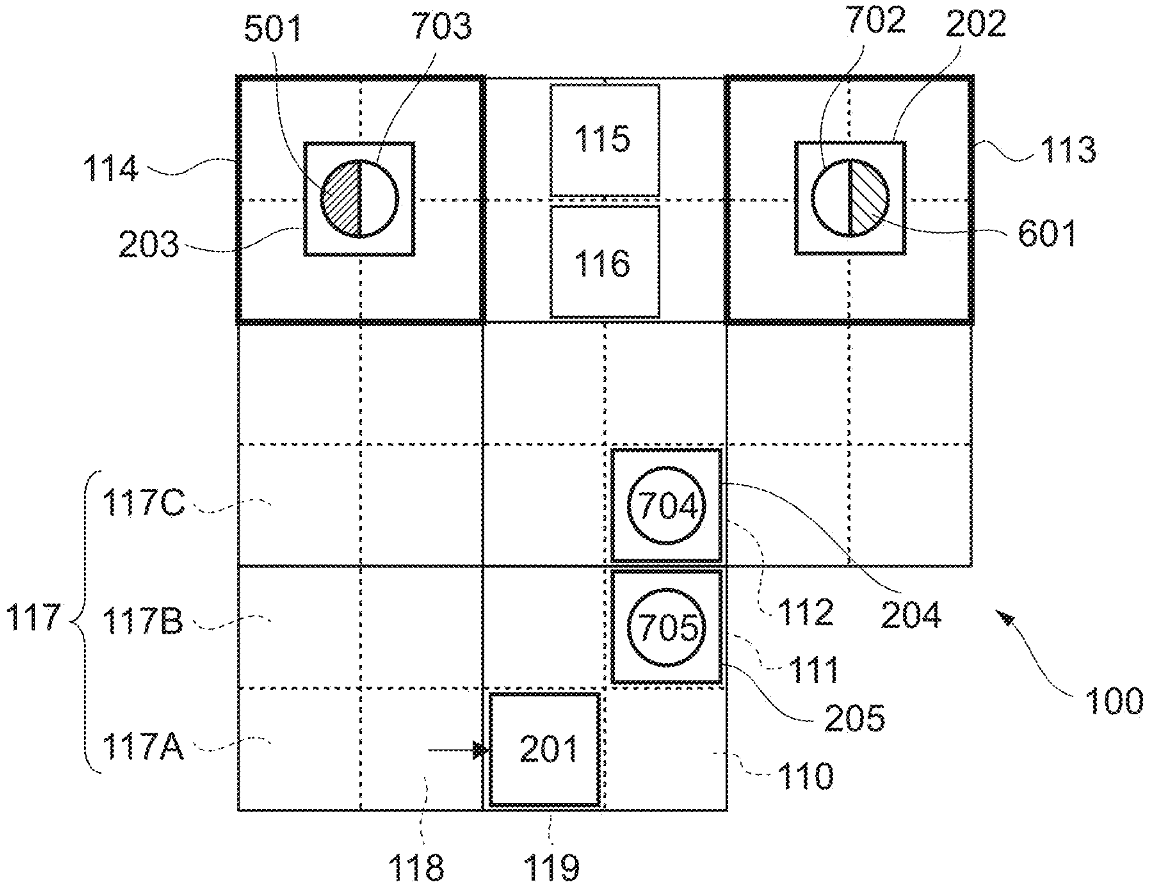
FIG. 16 shows a movement of a plurality of shuttles according to one or more embodiments of the present disclosure.

Thus, as shown in FIG. 16, for instance, the control device 300 can move the first shuttle 201 to the supply standby station 119 (Step S1).

Figure 17:
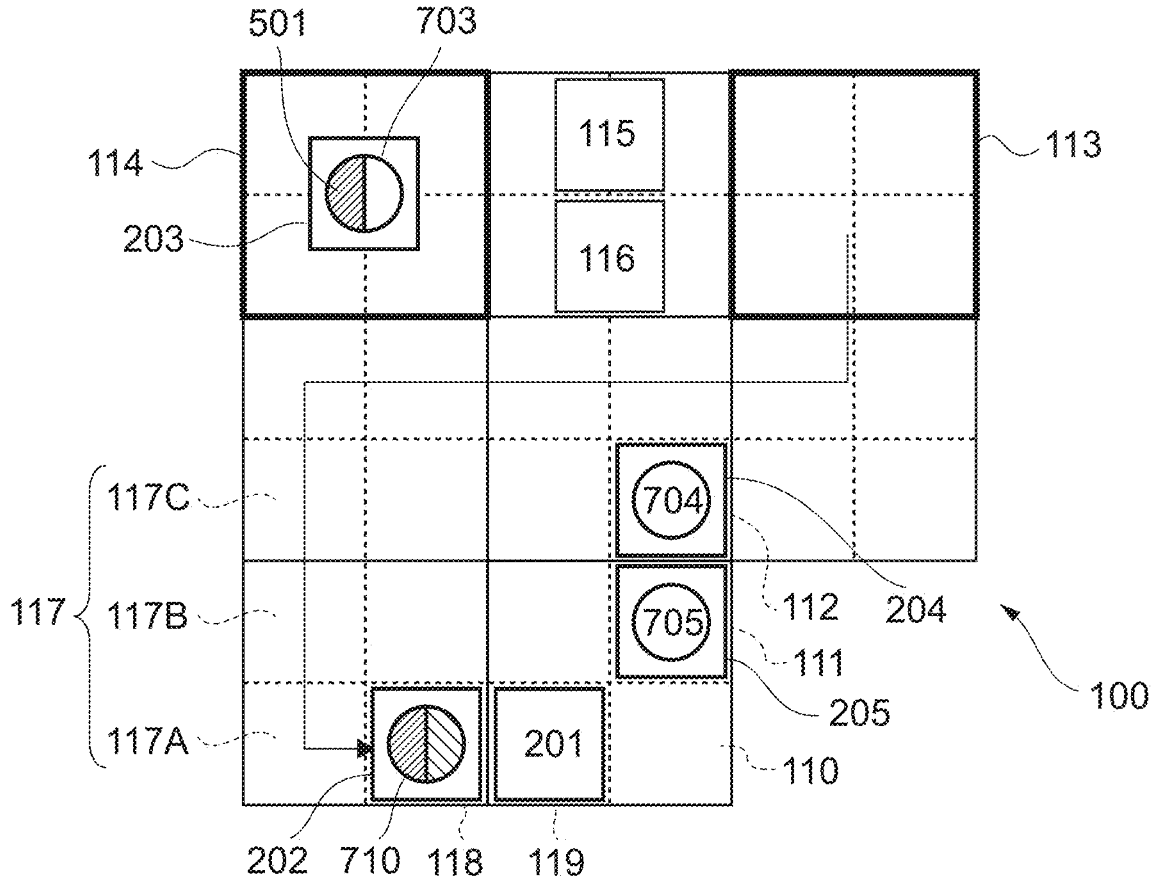
FIG. 17 shows a movement of a plurality of shuttles according to one or more embodiments of the present disclosure.

As shown in FIG. 17, for instance, the control device 300 can control the first machine 500 to perform the first operation on the workpiece 702 (on which the second operation has been already performed) mounted on the second shuttle 202 located at the first operation station 113 (Step S7). By the first operation, the first decoration 501 can be applied to the workpiece 702.

The control device 300 can move the second shuttle 202 from the first operation station 113 to the third ejecting standby station 117C, the second ejecting standby station 117B, and the first ejecting standby station 117A in this order (Step S12) and can move the second shuttle 202 to the ejecting station 118 (Step S13). At the time at which the second shuttle 202 reaches the third ejecting standby station 117C, the control device 300 can determine that the first operation station 113 is empty.

When the second shuttle 202 arrives at the ejecting station 118, the control device 300 can determine that all the operations for the workpiece 702 mounted on the second shuttle 202 are terminated and the workpiece 702 is or can be made into a finished product of the personal care product 710.

Figure 18:
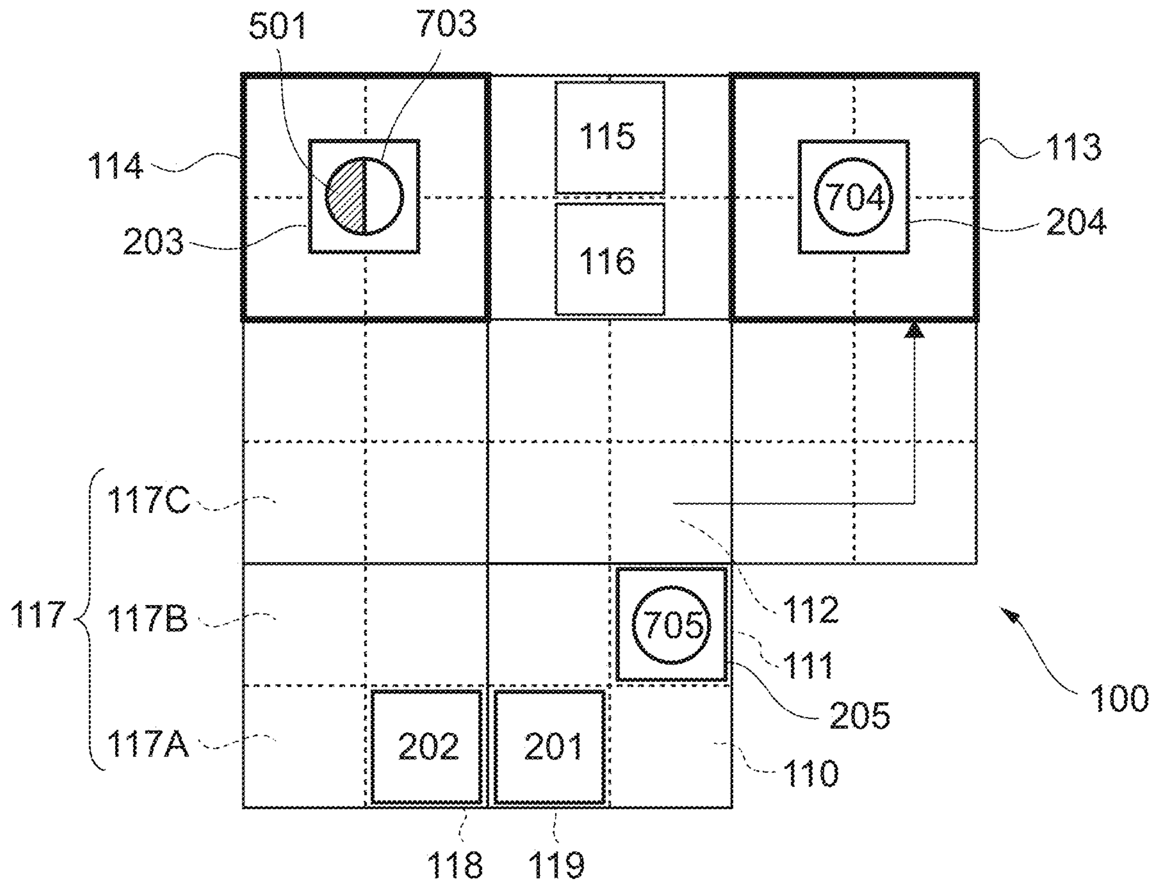
FIG. 18 shows a movement of a plurality of shuttles according to one or more embodiments of the present disclosure.

As shown in FIG. 18, for instance, the control device 300 can control the manipulator robot 400 to eject the workpiece 702 from the second shuttle 202 located at the ejecting station 118 (Step S14).

Concurrently, since the first operation standby station 115 and the second operation standby station 116 can both be empty, the control device 300 can move the fourth shuttle 204 from the third operation standby station 112 to the first operation station 113 (Step S6). As a result, the third operation standby station 112 can become empty.

Figure 19:
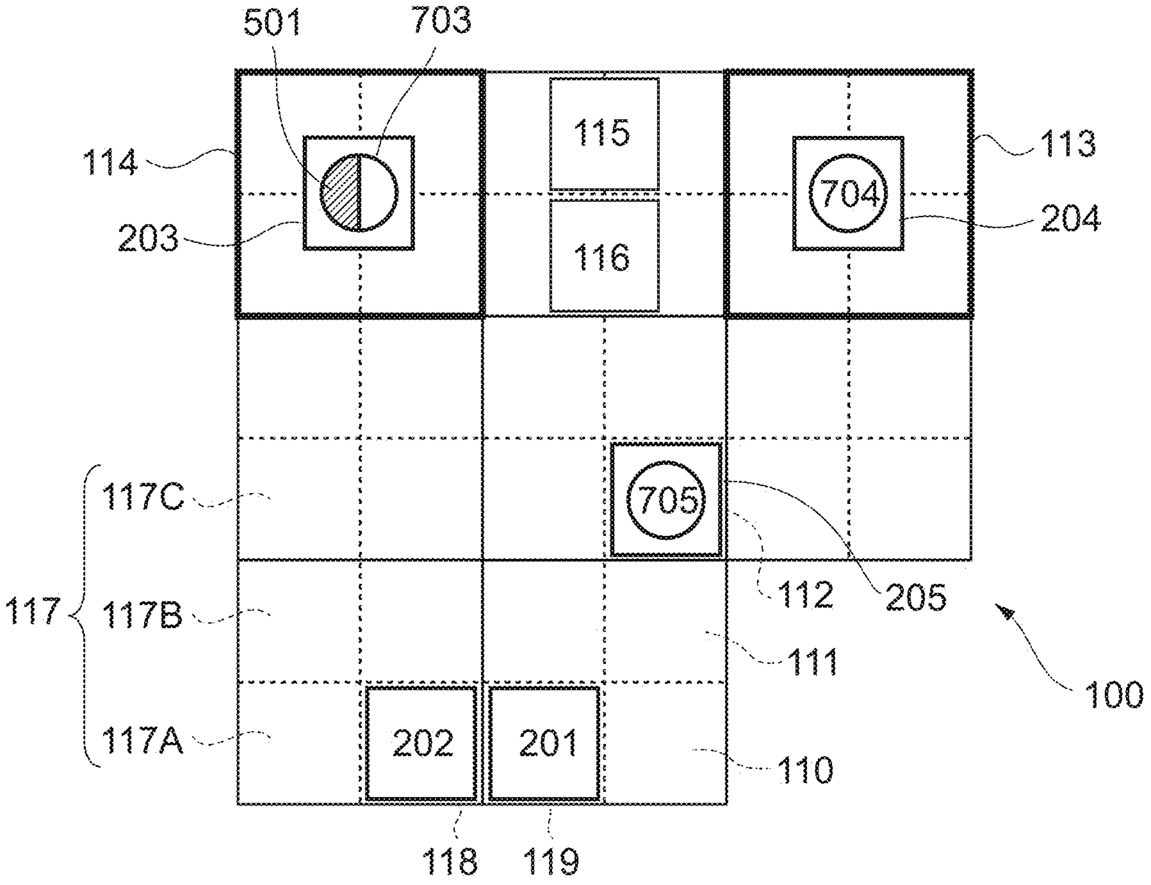
FIG. 19 shows a movement of a plurality of shuttles according to one or more embodiments of the present disclosure.

As shown in FIG. 19, for instance, the control device 300 can move the fifth shuttle 205 from the standby station 111 to the third operation standby station 112 (Step S5). As a result, the standby station 111 can become empty.

Figure 20:
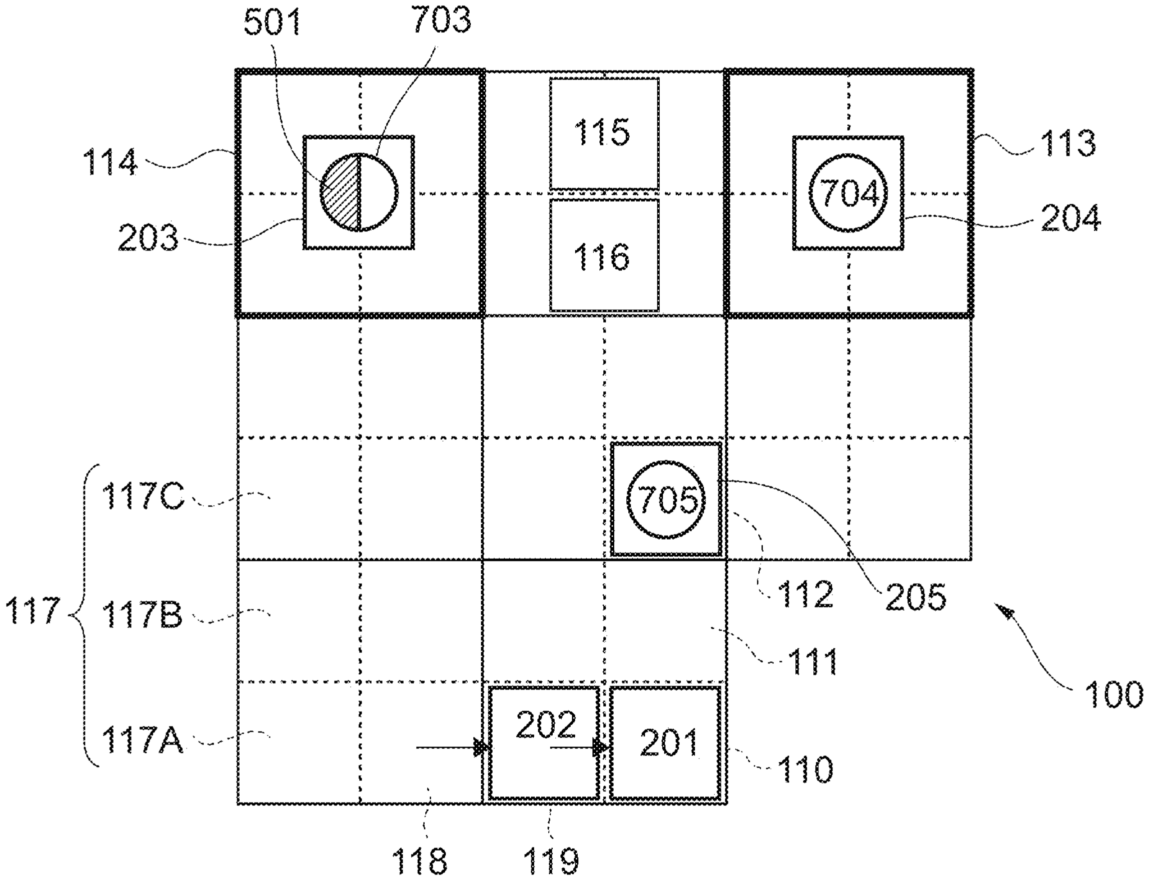
FIG. 20 shows a movement of a plurality of shuttles according to one or more embodiments of the present disclosure.

As shown in FIG. 20, for instance, the control device 300 can move the empty first shuttle 201 from the supply standby station 119 to the supply station 110 (Step S2). As a result, the supply standby station 119 can become empty.

The control device 300 can move the empty second shuttle 202 from the ejecting station 118 to the supply standby station 119 (Step S1). As a result, the ejecting station 118 can become empty.

Figure 21:
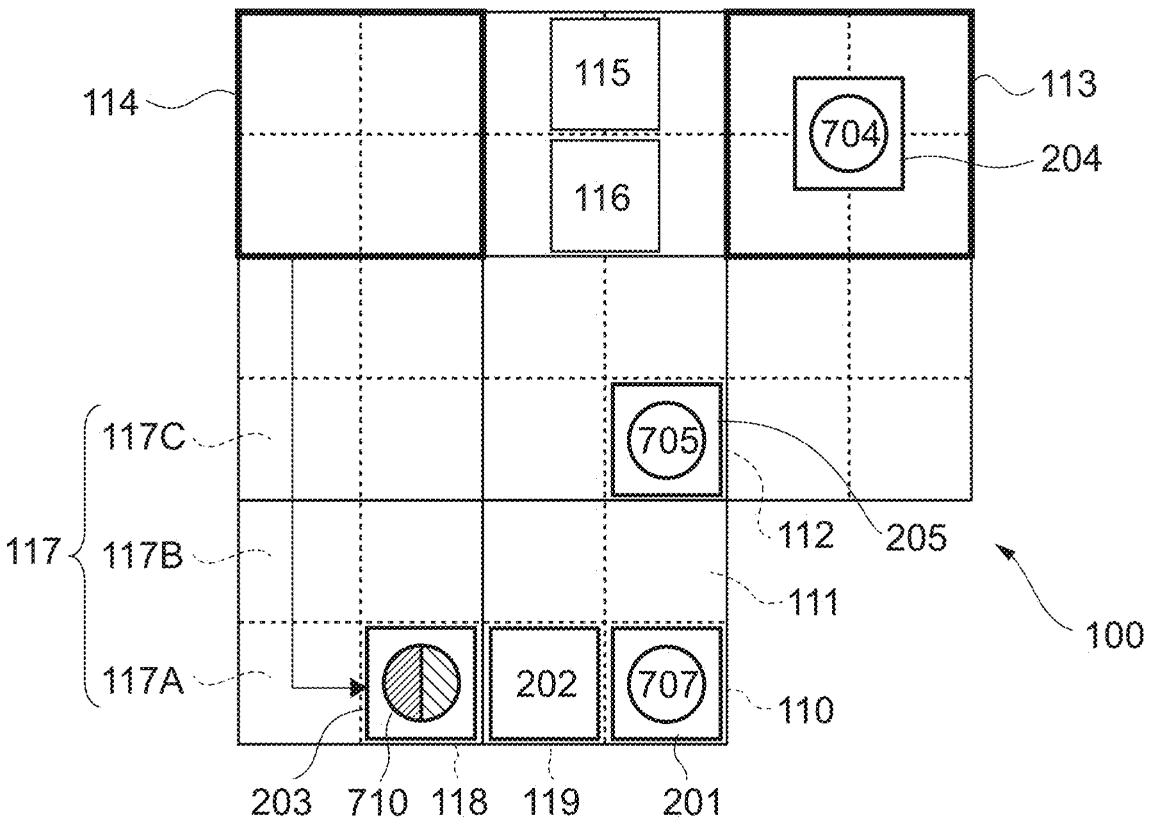
FIG. 21 shows a movement of a plurality of shuttles according to one or more embodiments of the present disclosure.

As shown in FIG. 21, for instance, the control device 300 can control the second machine 600 to perform the second operation on the workpiece 703 (on which the first operation has been already performed) mounted on the third shuttle 203 located at the second operation station 114 (Step S10). By the second operation, the second decoration 601 can be applied to the workpiece 703.

The control device 300 can move the third shuttle 203 from the second operation station 114 to the third ejecting standby station 117C, the second ejecting standby station 117B, and the first ejecting standby station 117A in this order (Step S12) and can move the third shuttle 203 to the ejecting station 118 (Step S13). At the time at which the third shuttle 203 reaches the third ejecting standby station 117C, the control device 300 can determine that the second operation station 114 is empty.

When the third shuttle 203 arrives at the ejecting station 118, the control device 300 can determine that all the operations for the workpiece 703 mounted on the third shuttle 203 are terminated and the workpiece 703 is or can be made into a finished product of the personal care product 710.

Concurrently, the control device 300 can control the manipulator robot 400 to mount a workpiece 707 on the first shuttle 201 located at the supply station 110 (Step S3).

Figure 22:
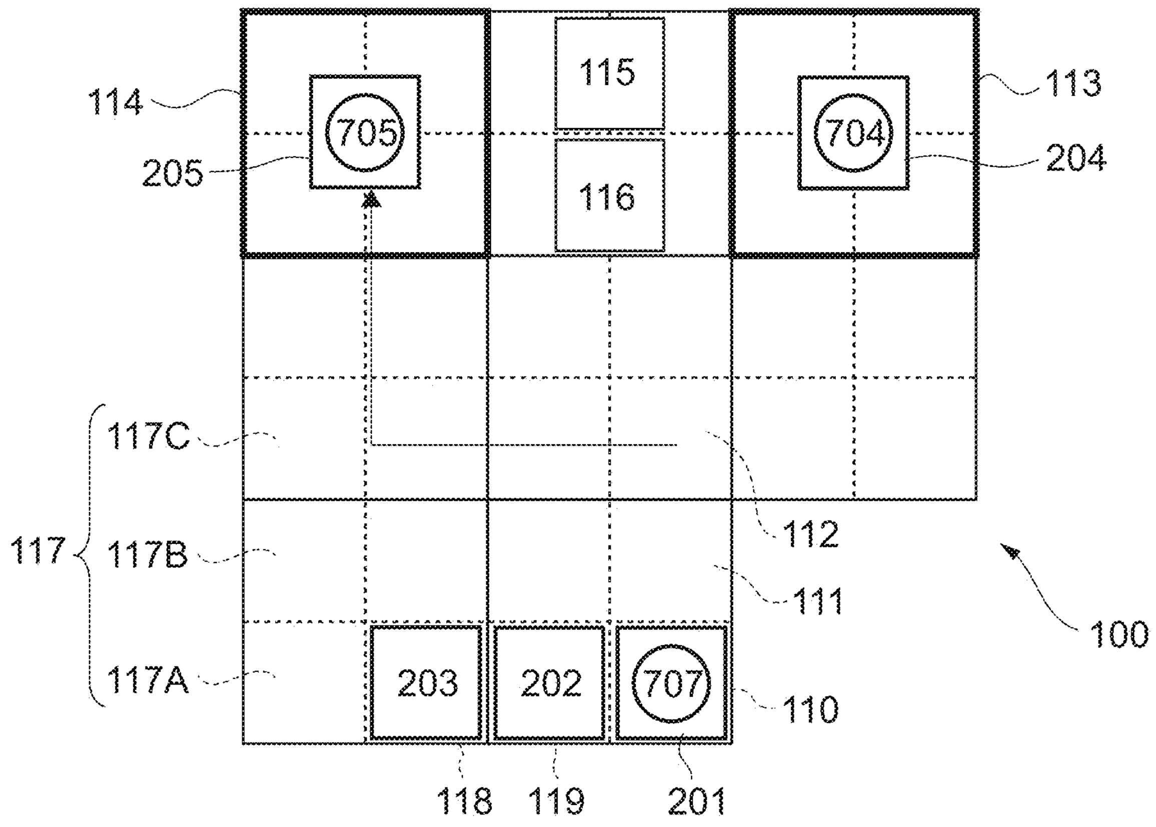
FIG. 22 shows a movement of a plurality of shuttles according to one or more embodiments of the present disclosure.

As shown in FIG. 22, for instance, the control device 300 can control the manipulator robot 400 to eject the workpiece 703 from the third shuttle 203 located at the ejecting station 118 (Step S14).

Concurrently, since the first operation standby station 115 and the second operation standby station 116 can both be empty, the control device 300 can move the fifth shuttle 205 located at the third operation standby station 112 to the second operation station 114 (Step S9). As a result, the third operation standby station 112 can become empty.

Figure 23:
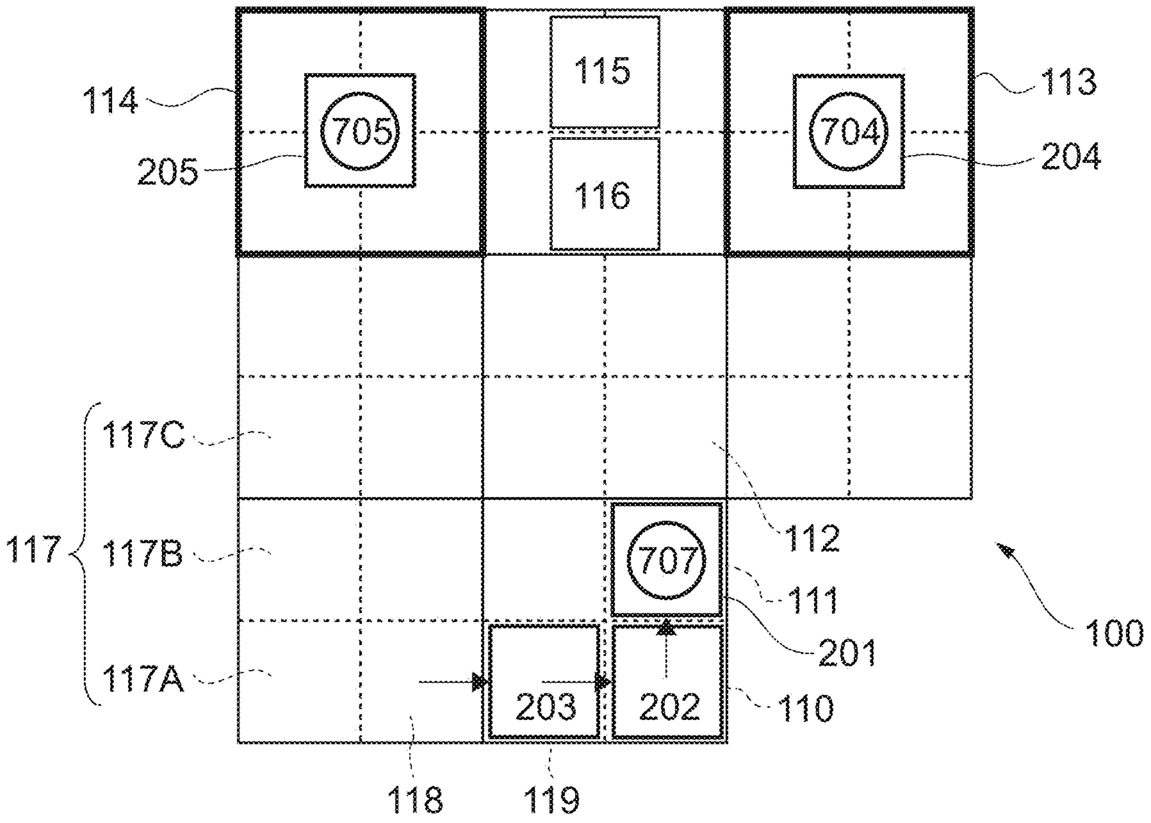
FIG. 23 shows a movement of a plurality of shuttles according to one or more embodiments of the present disclosure.

As shown in FIG. 23, the control device 300 can move the first shuttle 201 from the supply station 110 to the standby station 111 (Step S4). As a result, the supply station 110 can become empty.

The control device 300 can move the empty second shuttle 202 from the supply standby station 119 to the supply station 110 (Step S2). As a result, the supply standby station 119 can become empty.

The control device 300 can move the empty third shuttle 203 from the ejecting station 118 to the supply standby station 119 (Step S1). As a result, the ejecting station 118 can become empty.

Figure 24:
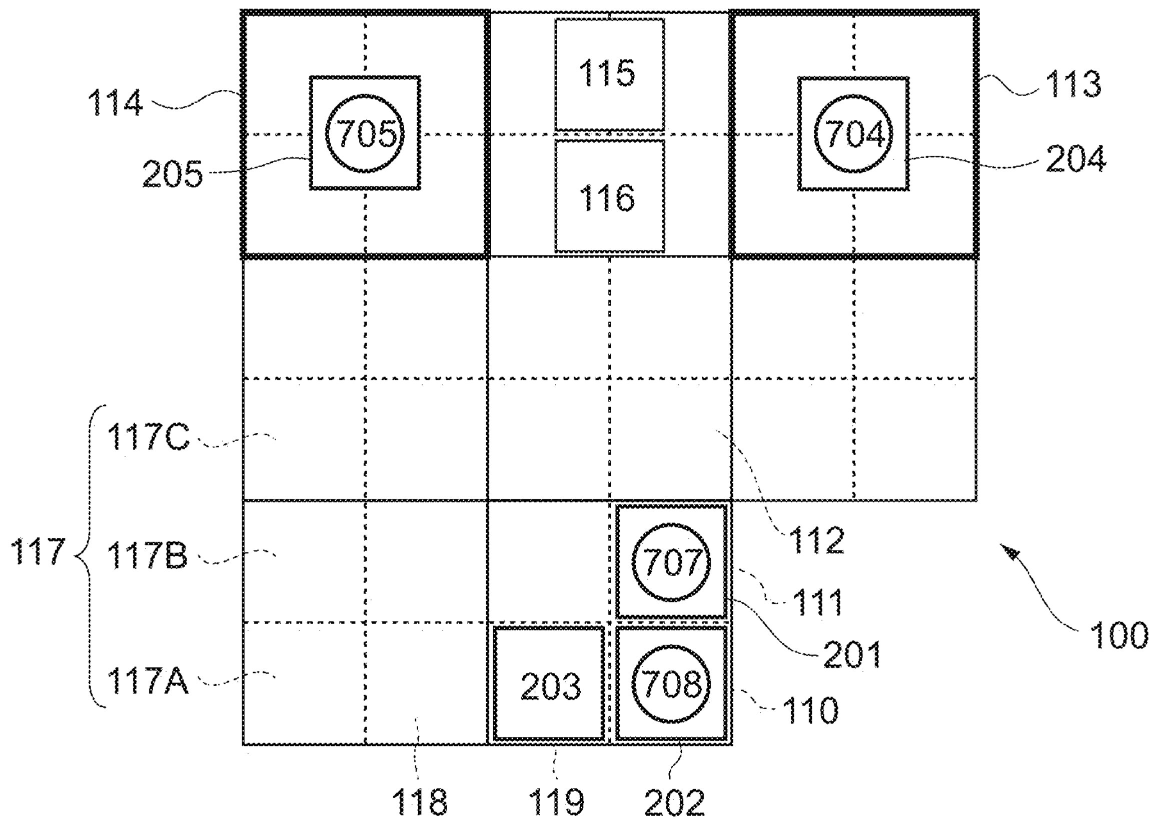
FIG. 24 shows a movement of a plurality of shuttles according to one or more embodiments of the present disclosure.

As shown in FIG. 24, for instance, the control device 300 can control the manipulator robot 400 to mount a workpiece 708 on the second shuttle 202 located at the supply station 110 (Step S3).

Figure 25:
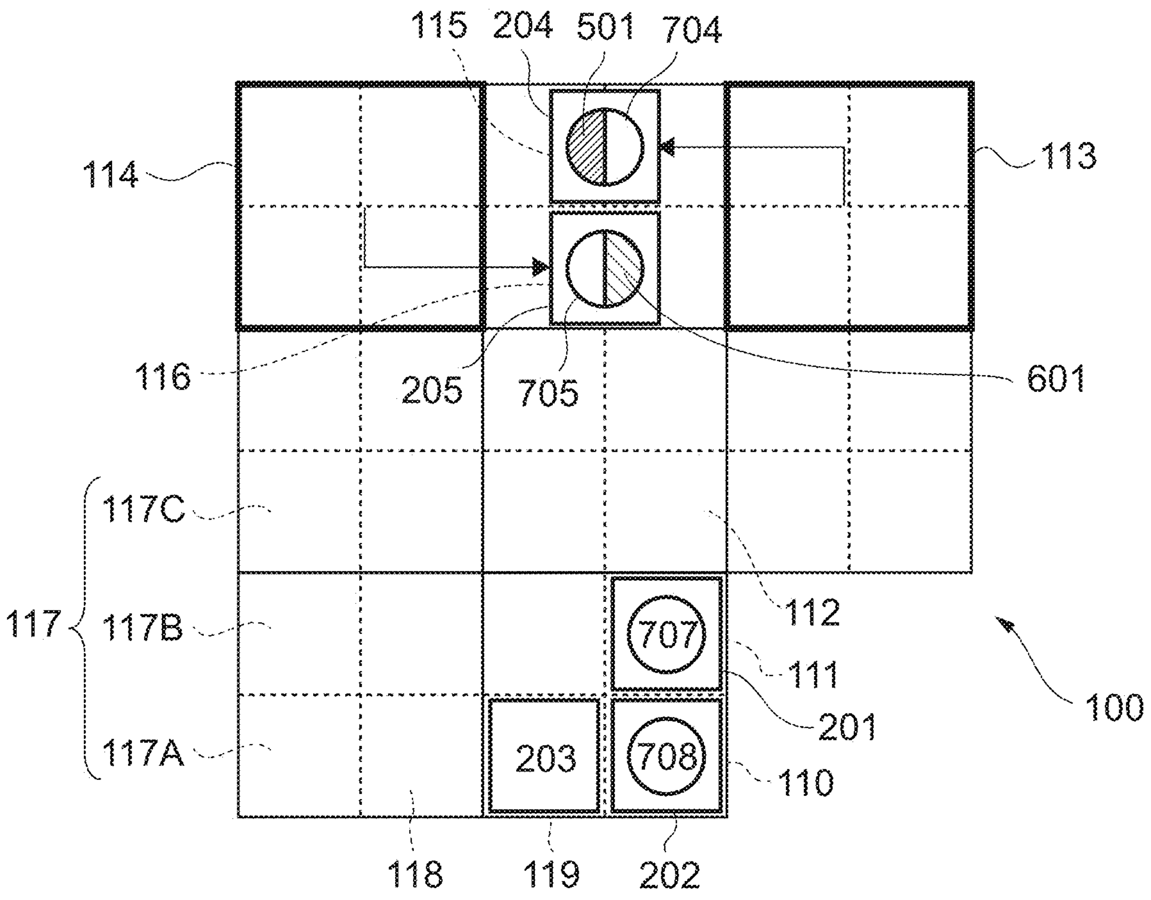
FIG. 25 shows a movement of a plurality of shuttles according to one or more embodiments of the present disclosure.

As shown in FIG. 25, for instance, the control device 300 can control the first machine 500 to perform the first operation on the workpiece 704 mounted on the fourth shuttle 204 located at the first operation station 113 (Step S7). By the first operation, the first decoration 501 can be applied to the workpiece 704.

The control device 300 can move the fourth shuttle 204 to the first operation standby station 115 (Step S8). As a result, the first operation station 113 can become empty.

The control device 300 can control the second machine 600 to perform the second operation on the workpiece 705 mounted on the fifth shuttle 205 located at the second operation station 114 (Step S10). By the second operation, the second decoration 601 can be applied to the workpiece 705.

The control device 300 can move the fifth shuttle 205 to the second operation standby station 116 (Step S11). As a result, the second operation station 114 can become empty.

Figure 26:
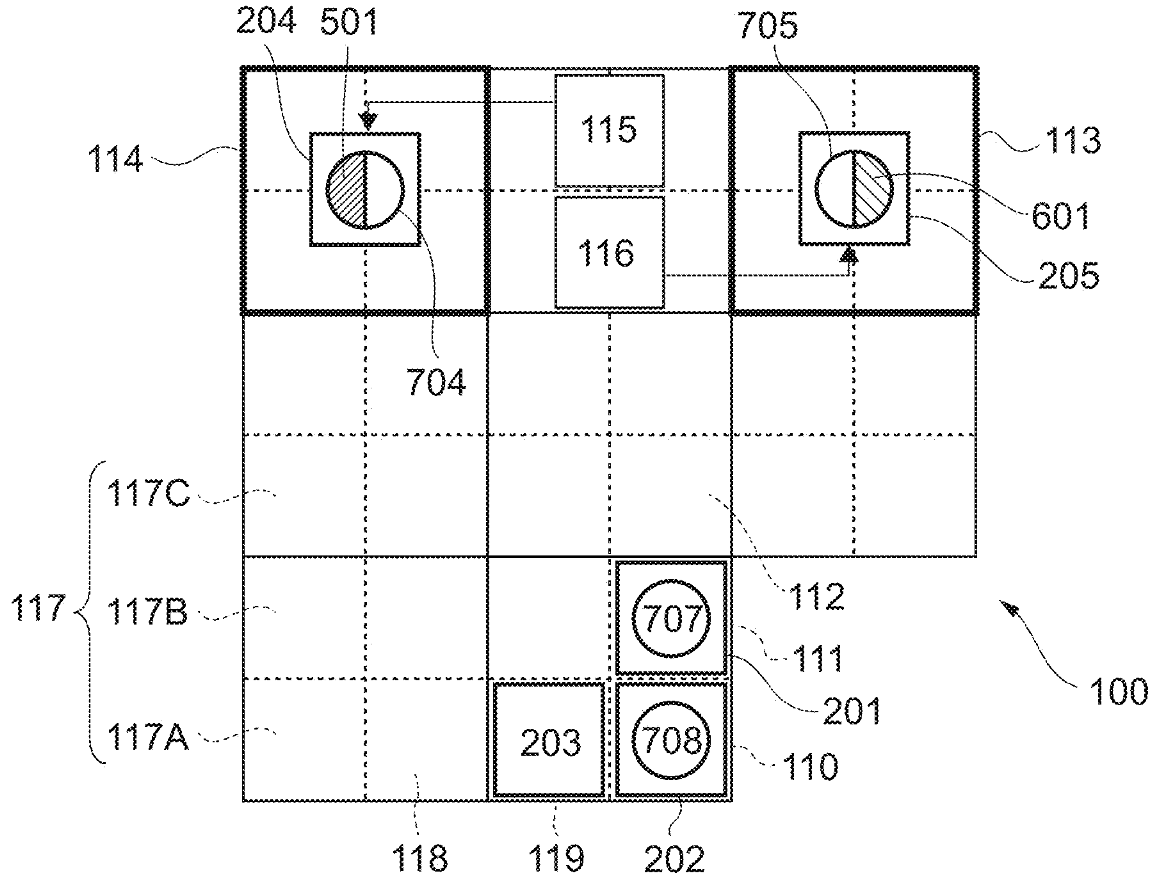
FIG. 26 shows a movement of a plurality of shuttles according to one or more embodiments of the present disclosure.

As shown in FIG. 26, for instance, the control device 300 can move the fourth shuttle 204 from the first operation standby station 115 to the second operation station 114 (Step S9). As a result, the first operation standby station 115 can become empty.

Concurrently, the control device 300 can move the fifth shuttle 205 from the second operation standby station 116 to the first operation station 113 (Step S6). As a result, the second operation standby station 116 can become empty.

Figure 27:
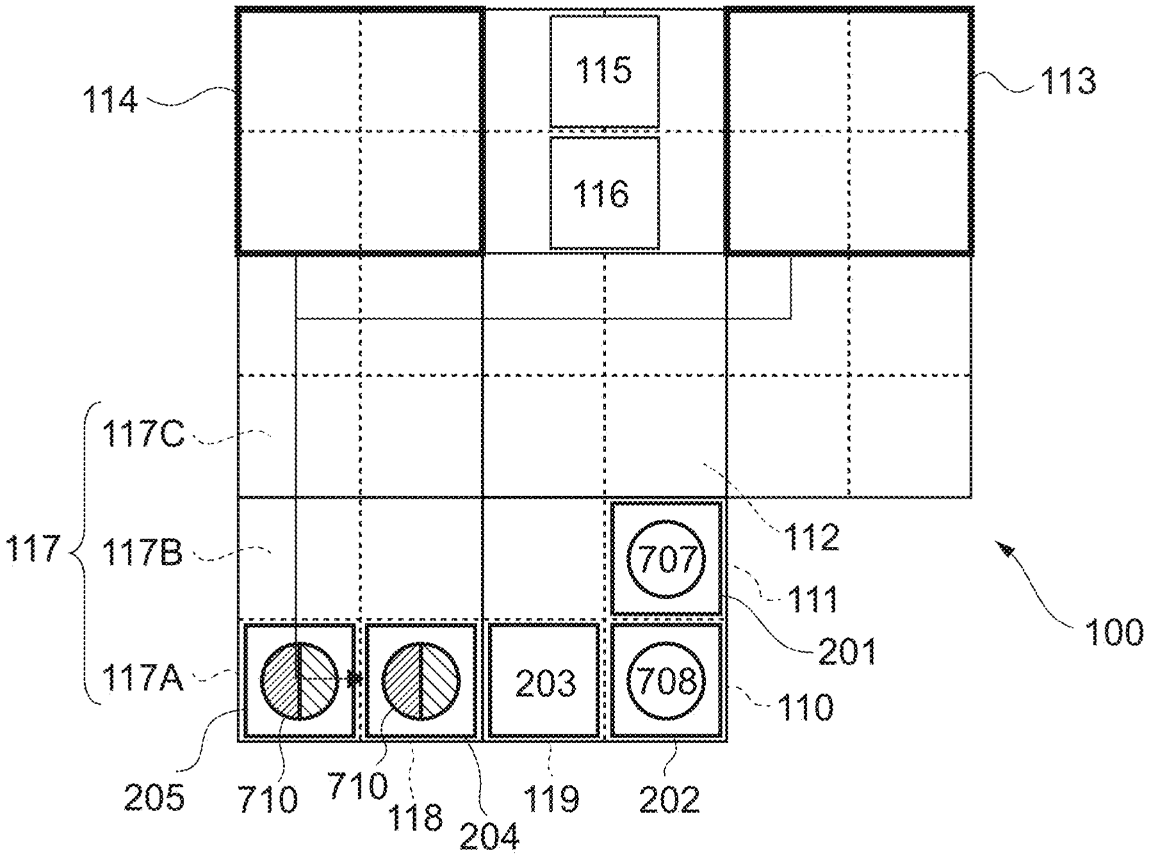
FIG. 27 shows a movement of a plurality of shuttles according to one or more embodiments of the present disclosure.

As shown in FIG. 27, for instance, the control device 300 can control the second machine 600 to perform the second operation on the workpiece 704 (on which the first operation has been already performed) mounted on the fourth shuttle 204 located at the second operation station 114 (Step S10). By the second operation, the second decoration 601 can be applied to the workpiece 704.

The control device 300 can move the fourth shuttle 204 from the second operation station 114 to the third ejecting standby station 117C, the second ejecting standby station 117B, and the first ejecting standby station 117A in this order (Step S12) and can move the fourth shuttle 204 to the ejecting station 118 (Step S13).

When the fourth shuttle 204 arrives at the ejecting station 118, the control device 300 can determine that all the operations for the workpiece 704 mounted on the fourth shuttle 204 are terminated and the workpiece 704 is or can be made into a finished product of the personal care product 710.

Concurrently, the control device 300 can control the first machine 500 to perform the first operation on the workpiece 705 (on which the second operation has been already performed) mounted on the fifth shuttle 205 located at the first operation station 113 (Step S7). By the first operation, the first decoration 501 can be applied to the workpiece 705.

The control device 300 can move the fifth shuttle 205 from the first operation station 113 to the third ejecting standby station 117C and the second ejecting standby station 117B in this order, and then to the first ejecting standby station 117A (Step S12). At the time at which the fifth shuttle 205 reaches the third ejecting standby station 117C, the control device 300 can determine that the first operation station 113 is empty.

In such a manner, the control device 300 can perform the first operation at the first operation station 113 on the workpiece 704 mounted on the fourth shuttle 204, and concurrently can perform the second operation at the second operation station 114 on the workpiece 705 mounted on the fifth shuttle 205 (FIGS. 24 to 25).

Further, the control device 300 can control the movement of a plurality of the first to fifth shuttles 201 to 205 so as to perform the second operation at the second operation station 114 on the workpiece 704 mounted on the fourth shuttle 204 and concurrently can perform the first operation at the first operation station 113 on the workpiece 705 mounted on the fifth shuttle 205 (e.g., FIGS. 26 to 27).

Figure 28:
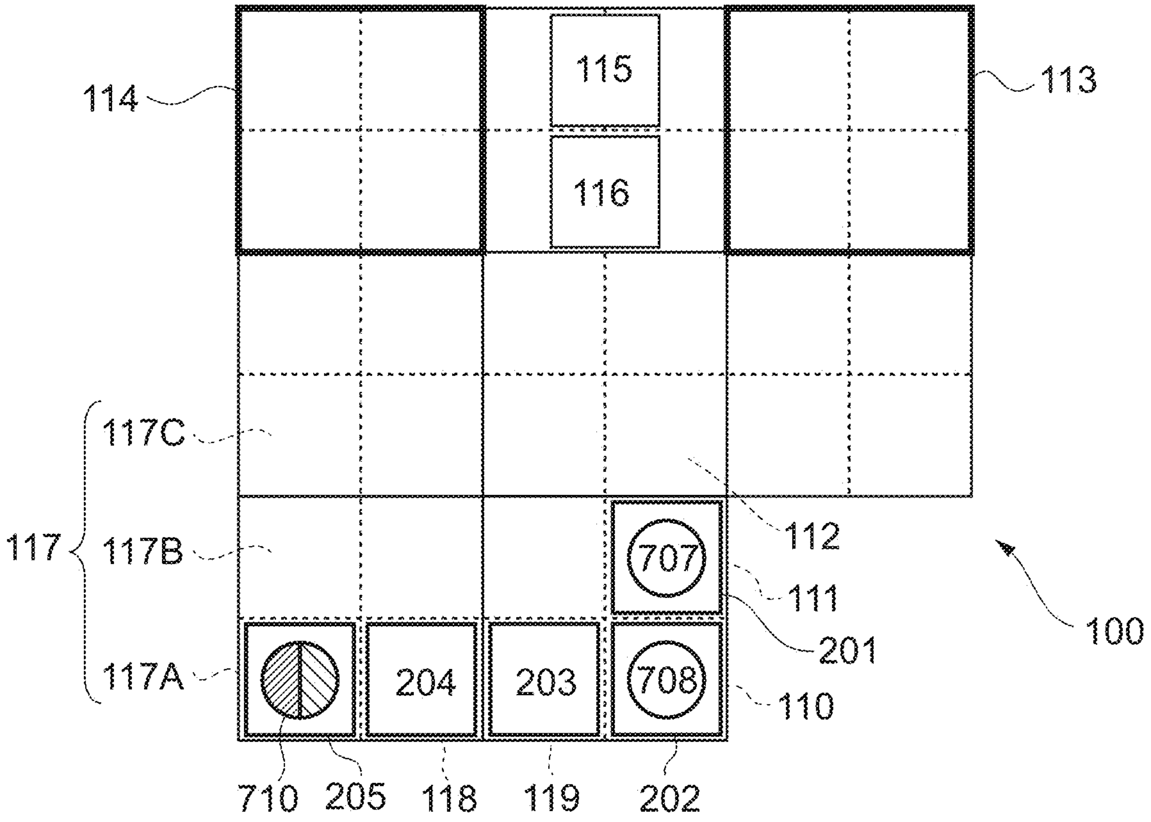
FIG. 28 shows a movement of a plurality of shuttles according to one or more embodiments of the present disclosure.

As shown in FIG. 28, for instance, the control device 300 can control the manipulator robot 400 to eject the workpiece 704 from the fourth shuttle 204 located at the ejecting station 118 (Step S14).

Figure 29:
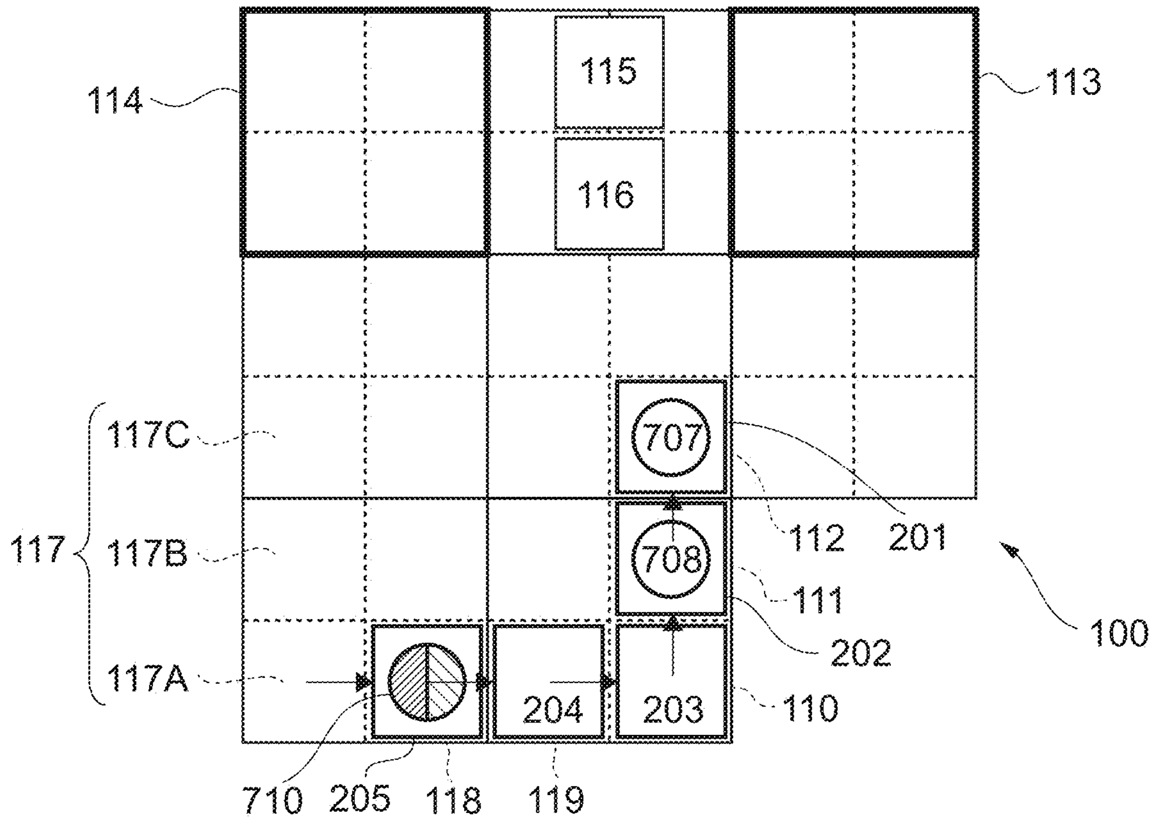
FIG. 29 shows a movement of a plurality of shuttles according to one or more embodiments of the present disclosure.

As shown in FIG. 29, for instance, the control device 300 can move the first shuttle 201 from the standby station 111 to the third operation standby station 112 (Step S5). As a result, the standby station 111 can become empty.

The control device 300 can move the second shuttle 202 from the supply station 110 to the standby station 111 (Step S4). As a result, the supply station 110 can become empty.

The control device 300 can move the empty third shuttle 203 from the supply standby station 119 to the supply station 110 (Step S2). As a result, the supply standby station 119 can become empty.

The control device 300 can move the empty fourth shuttle 204 from the ejecting station 118 to the supply standby station 119 (Step S1). As a result, the ejecting station 118 can become empty.

The control device 300 can move the fifth shuttle 205 from the first ejecting standby station 117A to the ejecting station 118 (Step S13). As a result, the first ejecting standby station 117A can become empty.

Figure 30:
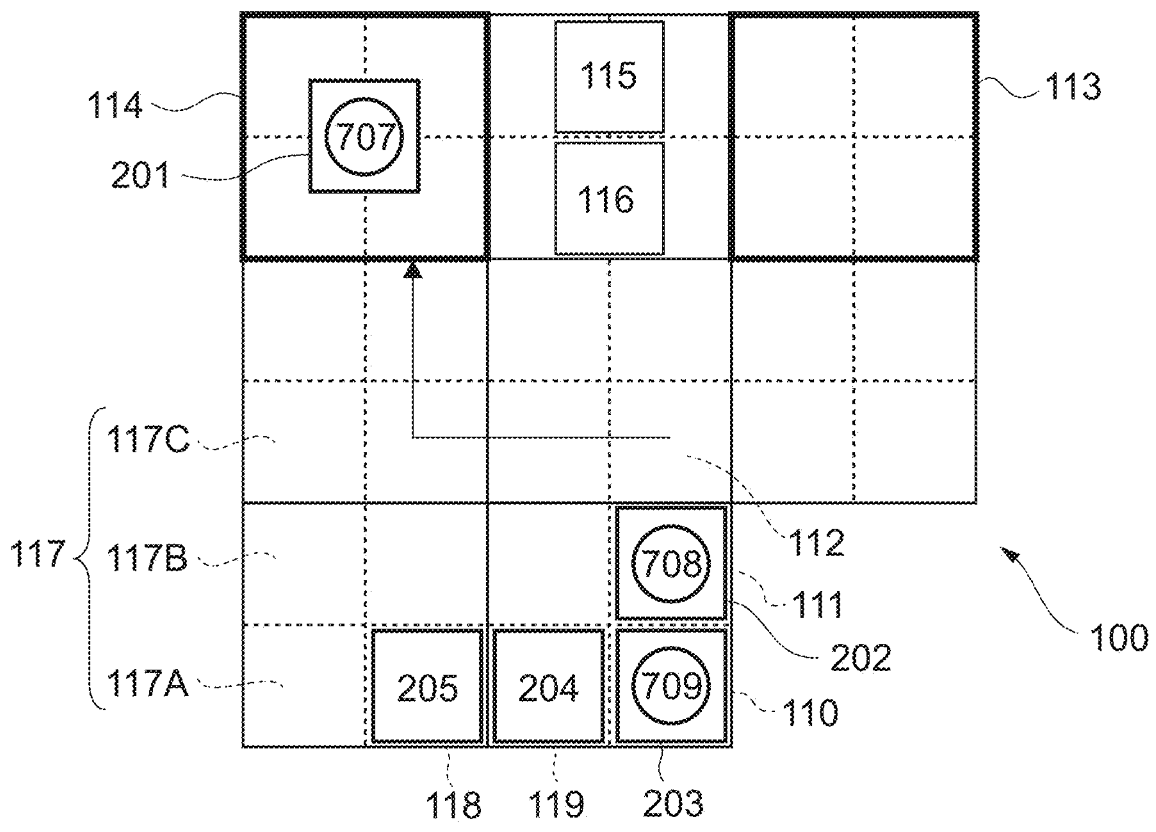
FIG. 30 shows a movement of a plurality of shuttles according to one or more embodiments of the present disclosure.
Figure 31:
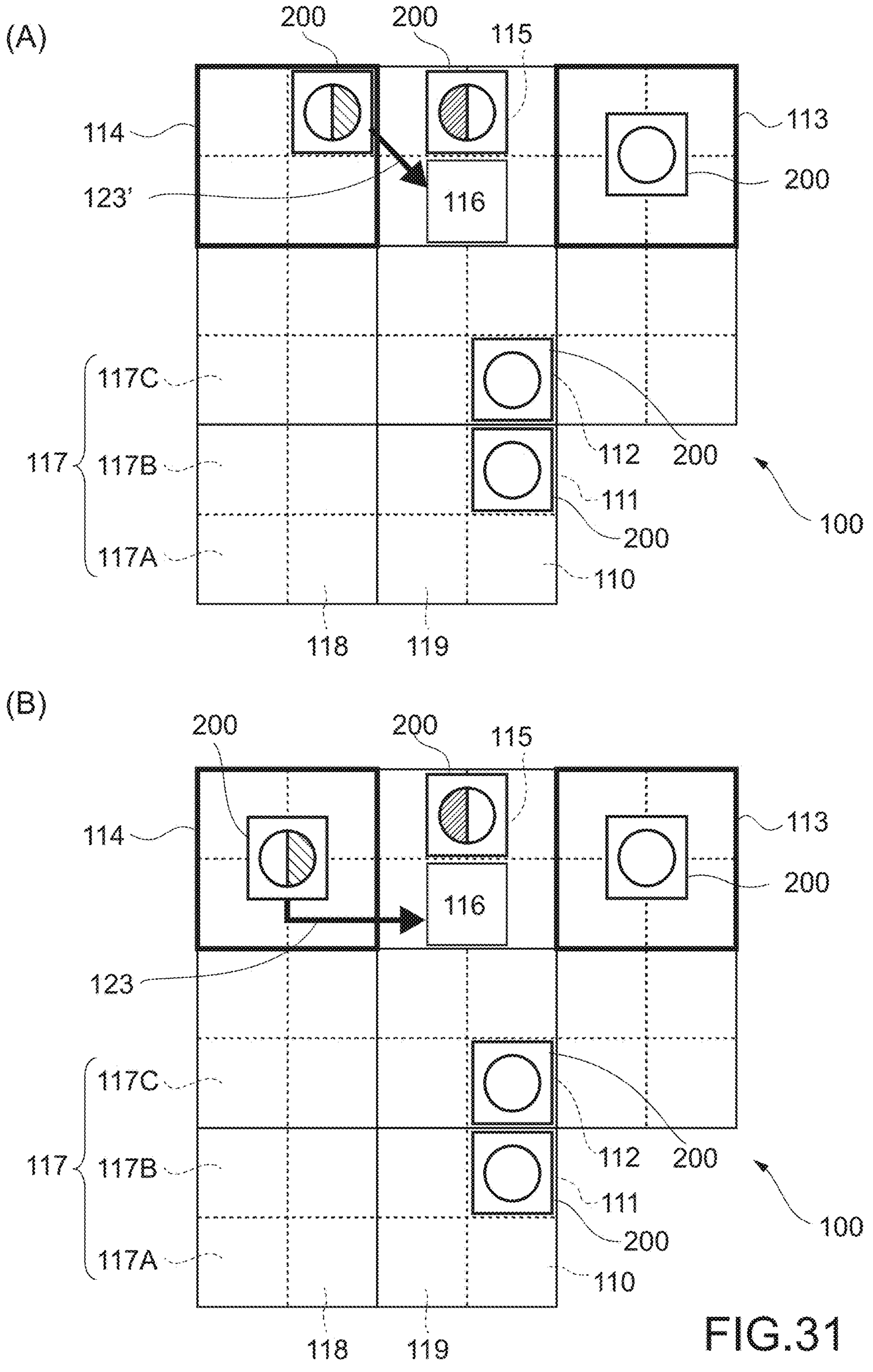
FIG. 31 shows an initial arrangement of a plurality of shuttles according to one or more embodiments of the present disclosure.

As shown in FIG. 30, for instance, the control device 300 can control the manipulator robot 400 to eject the workpiece 705 from the fifth shuttle 205 located at the ejecting station 118 (Step S14).

Concurrently, since the first operation standby station 115 and the second operation standby station 116 can both be empty, the control device 300 can move the first shuttle 201 from the third operation standby station 112 to the second operation station 114 (Step S9). As a result, the third operation standby station 112 can become empty.

Concurrently, the control device 300 can control the manipulator robot 400 to mount a workpiece 709 on the empty third shuttle 203 located at the supply station 110 (Step S3).

4. EXAMPLES OF FIRST MACHINE AND SECOND MACHINE

Figure 32:
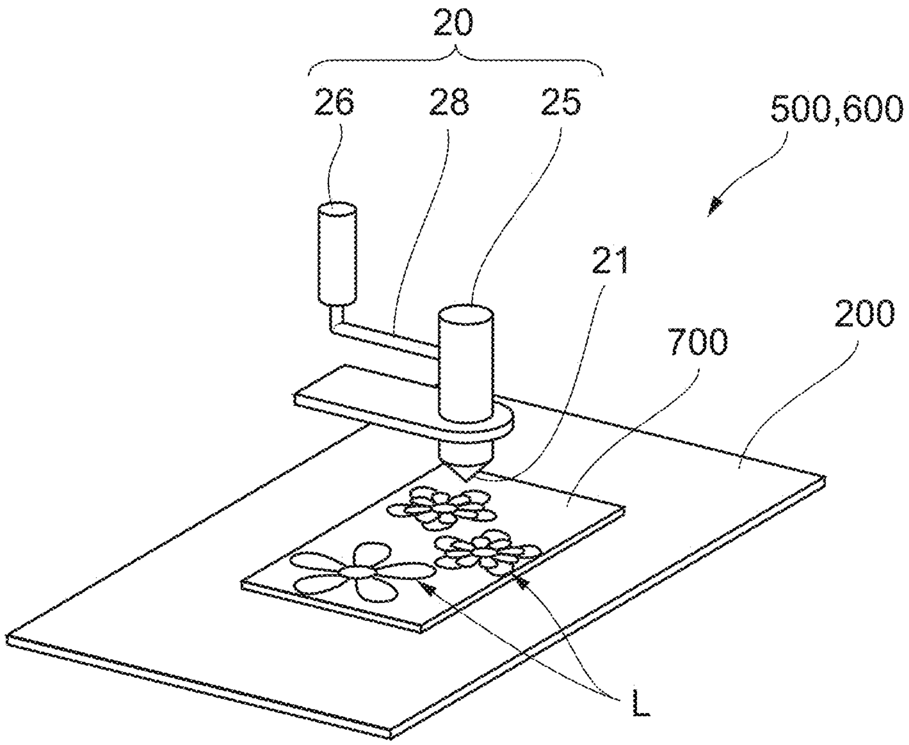
FIG. 32 shows an example of a first machine and a second machine according to one or more embodiments of the present disclosure.

The first machine 500 and/or the second machine 600 can include a supply unit 20 that supplies a composition L having fluidity onto a workpiece 700 to which the composition is to be supplied, and a nozzle 21, which may be integrally disposed, for instance, so as to communicate with the supply unit 20. A shuttle 200, which can be flat and in the form of a plate, can be disposed at a position lower than the nozzle 21 and facing the nozzle 21, and the workpiece 700 can be mounted on the upper surface of the shuttle 200. FIG. 32 shows an example including those components.

The first machine 500 and/or the second machine 600 can support or holds the supply unit 20 and the shuttle 200 at predetermined positions. The control device 300 can control the first machine 500 or the second machine 600 to move the position of the nozzle 21 and the position of the shuttle 200 relative to each other in any direction. This can make it possible to move at least one of the nozzle 21 or the shuttle 200 in a plane direction, a vertical direction, or a combination direction thereof to move at least one of the nozzle 21 or the workpiece 700 on the shuttle 200 relative to the other one.

The supply unit 20 can be a member that feeds the composition L having fluidity to the workpiece 700 side. The supply unit 20 can include a liquid feeding part 25 and a composition storing part 26.

The liquid feeding part 25 can be connected with the composition storing part 26 via a flow path 28. This can make it possible to continuously or non-continuously supply the composition L, which is supplied from the composition storing part 26 to the inside of the liquid feeding part 25, to the nozzle 21 side, or to stop supply. For such a liquid feeding part 25, a jet dispenser capable of discharging the composition L in the form of liquid droplets, or a MOHNO DISPENSER (Registered trademark) or screw dispenser capable of continuously discharging the composition L can be used.

The composition storing part 26 can be configured to be connected, at one end thereof, with pressurizing means for air or the like or a pump, and configured to be capable of pressure-feeding the composition L stored in the composition storing part 26 to the liquid feeding part 25 side via the flow path 28.

The nozzle 21 can be a tubular member that supplies the composition L from the supply unit 20 toward the workpiece 700. The nozzle 21 can include a flow path for the composition L, which can be regarded as a space formed therein along a flow direction of the composition L. In the nozzle 21, a nozzle tip at one end thereof can constitute a supply port for the composition L, and the other end thereof can be connected to communicate with the supply unit 20 described above. The constituent material of the nozzle may not be particularly limited, and for example, metal or plastic may be employed.

5. EXAMPLES OF COMPOSITION

Unless otherwise noted, the states (e.g., three states) of the substances to be described below can be based on one atmospheric pressure and 20° C.

The composition can have a viscosity of preferably 0.1 Pa·s or more, more preferably 0.5 Pa·s or more, and even more preferably 1 Pa·s or more, for instance, from the viewpoint of improving the uniform dispersibility of the material contained in the composition and stabilizing the quality, and suppressing the collapse of the first sculpture or the second sculpture discharged from the nozzle and stabilizing the shape.

Further, the viscosity can be preferably 1000 Pa·s or less, more preferably 500 Pa·s or less, and even more preferably 200 Pa·s or less, for instance, from the viewpoint of improving the discharging performance and improving the formability.

The viscosity of the composition described above may be measured after the temperature of the composition is set to the same as the temperature of the composition when supplied from the nozzle 21, that is, when discharged. For example, if the composition is a composition other than a heated molten liquid, such as slurry, and is supplied from the nozzle at room temperature (25° C.), it can be assumed that the temperature has a value measured using a B-type viscometer (a digital viscometer TVB-10R manufactured by Toki Sangyo Co., Ltd.) at 25° C. In this case, the measurement conditions can be as follows: the rotor is set to one of the rotor Nos. M1, M2, M3, M4, H1, H2, H3, H4, H5, H6, H7, T-A, T-B, T-C, T-D, and T-E in accordance with the viscosity range of the sample; the rotation speed is set to 3 to 100 rpm; and the measurement duration is set to 60 seconds. If the composition is a heated molten liquid, the temperature of the composition can be set to the same as the temperature of the composition supplied from the nozzle 21, and the viscosity can then be measured under the measurement conditions described above.

The composition, according to one or more embodiments of the present disclosure, can contain one kind or two or more kinds selected from solid substances such as powders and oils.

As such solid substances, for example, it may be preferable to contain powder used for normal cosmetic components such as a coloring pigment and an extender pigment.

Examples of the coloring pigment and the extender pigment can include an inorganic powder, an organic powder, and a compound powder of an inorganic powder and an organic powder.

Examples of the inorganic powder can include silicic acid, silicic anhydride, magnesium silicate, talc, sericite, mica, kaolin, red iron oxide, clay, bentonite, mica, titanium coated mica, bismuth oxychloride, zirconium oxide, magnesium oxide, titanium oxide, zinc oxide, aluminum oxide, calcium sulfate, barium sulfate, magnesium sulfate, calcium carbonate, magnesium carbonate, iron oxide, ultramarine, chromium oxide, chromium hydroxide, calamine, carbon black, boron nitride, and composites thereof. Examples of the organic powder can include polyamide, nylon, polyester, polypropylene, polystyrene, polyurethane, vinyl resin, urea resin, phenol resin, fluoropolymer resin, silicone resin, acrylic resin, melamine resin, epoxy resin, polycarbonate resin, divinylbenzene-styrene copolymer, silk powder, cellulose, long-chain alkyl phosphoric acid metal salt, N-mono long-chain alkylacyl basic amino acid, and composites thereof.

Those extender pigments and coloring pigments can be colored or non-colored (e.g., white or substantially transparent), and can provide the composition or the skin with one or more effects from among coloring, light diffraction, oil absorption, translucency, opacity, glossiness, a matte appearance, smoothness, and the like.

The content of the powder in the composition may vary according to its purpose, but can be preferably 20 mass % or more, more preferably 30 mass % or more, and even more preferably 40 mass % or more, for instance, from the viewpoint of productivity such as drying.

The content of the powder in the composition can be preferably 85 mass % or less, more preferably 80 mass % or less, and even more preferably 70 mass % or less, for instance, from the viewpoint of productivity such as fluidity at the time of supply.

In such a range, a personal care product having a highly refined three-dimensional shape can be suitably manufactured, and a good feeling of use when the product can be used can be enhanced.

From the viewpoint of adjusting optical properties such as coloring power, brightness, and saturation, the mean particle size of the powder in the composition can be preferably 0.1 μm or more, and more preferably 1 μm or more.

From the viewpoint of suppressing the clog of the nozzle and of continuously allowing stable discharging, the mean particle size of the powder in the composition can be preferably 300 μm or less, more preferably 150 μm or less, and more preferably 100 μm or less.

The mean particle size can be regarded as a volume cumulative particle size D50 at a cumulative volume of 50 vol. % measured by a laser diffraction/scattering particle size distribution measurement device. Note that if the mean particle size of the powder is measured from a final product, first, the product may be dissolved in water or oil, and a binder component may be dissolved to disperse the particles in the solvent. Subsequently, the particle size distribution of the solid object can be measured using a particle size distribution meter, and the resultant volume cumulative particle size D50 obtained can be defined as the mean particle size.

From the viewpoint of stable supply from the nozzle, the mean particle size of the powder in the composition can be preferably smaller than a length D1 of the cross-section of the nozzle 21. If the cross-section of the nozzle 21 is not a perfect circle, the minimum length of the cross-section of the nozzle can be set to D1.

From the viewpoint of reducing a line width W1 in plan view of the first sculpture or the second sculpture manufactured by the method described above and of stably forming a three-dimensional and highly refined design, the mean particle size of the powder in the composition can have a ratio with the length D1 of the cross-section of the nozzle 21 (mean particle size/nozzle cross-section length), which may be preferably 1 or less, more preferably 0.5 or less, even more preferably 0.35 or less, and still even more preferably 0.3 or less.

The mean particle size/nozzle cross-section length can be preferably as small as possible, such as 0.001 or more.

The oil that may be contained in the fluid can include one kind or two or more kinds, for instance, selected from oils that are liquid at one atmospheric pressure and at 20° C. (hereinafter, also referred to as liquid oils) and oils that are solid at one atmospheric pressure and at 20° C. (hereinafter, may also be referred to as solid-state oils).

Examples of the liquid oils can include linear and/or branched hydrocarbon oils, plant oils, animal oils, ester oils, silicone oils, and high molecular alcohols.

Examples of the linear or branched hydrocarbon oils can include liquid paraffin and squalane. Examples of the plant oils can include a jojoba oil and an olive oil.

Examples of the animal oils can include liquid lanolin.

Examples of the ester oils can include monoalcohol fatty acid ester, and polyhydric alcohol fatty acid ester.

Examples of the silicone oils can include dimethylpolysiloxane, dimethylcyclopolysiloxane, methylphenylpolysiloxane, methylhydrogenpolysiloxane, and higher alcohol modified organopolysiloxane. Examples of the high molecular alcohols can include polyethylene glycol.

Examples of the solid-state oils can include vaseline, cetanol, stearyl alcohol, and ceramide.

The content of the oil in the composition can vary according to its purpose, but can be, for instance, preferably 0.5 mass % or more, more preferably 1 mass % or more, and even more preferably 1.5 mass % or more, as a total quantity.

The content of the oil in the composition can be preferably 30 mass % or less, more preferably 20 mass % or less, and even more preferably 15 mass % or less.

In such a range, favorable color developability and feel as a personal care product can be enhanced.

According to the type of a target personal care product, the composition can appropriately contain one kind or two or more kinds of components selected from thickeners, coating agents, surfactants, glucoses, polyhydric alcohols, water-soluble macromolecules, metal ion-sequestering agents, lower alcohols, amino acids, organic amines, pH control agents, skin conditioning agents, vitamins, antioxidants, flavoring substances, antiseptics, ultraviolet absorbers, ultraviolet scattering agents, and the like, within a range where the effects of one or more embodiments the present disclosure are not impaired.

Examples of the ultraviolet absorbers can include one kind or two or more kinds selected from benzophenone derivatives and methoxycinnamate derivatives.

Examples of the benzophenone derivatives can include dihydroxybenzophenone, dihydroxydimethoxybenzophenone, hydroxymethoxybenzophenone sulfonate, and dihydroxydimethoxybenzophenone disulfonate.

Examples of the methoxycinnamate derivatives can include 2-ethylhexyl methoxycinnamate.

For the ultraviolet scattering agents, according to one or more embodiments of the present disclosure, fine particles having a mean particle size of 0.1 μm or less can be used.

Examples of the ultraviolet scattering agents can include one kind or two or more kinds from zinc oxide, titanium oxide, and silica.

According to one or more embodiments the composition can further include a liquid medium. The liquid medium can be a solvent to dissolve or disperse a cosmetic or a liquid that can be used as a dispersion medium.

In the case where the composition is in the form of slurry, the composition can be a mixture containing at least a powder and a liquid medium. In the case where the composition is in the form of cosmetic slurry, the composition can be a mixture containing at least a powder containing the pigment described above, an oil, and a liquid medium.

Examples of the above-mentioned liquid (liquid medium) can include a substance (volatile solvent) having volatility in a liquid state. According to one or more embodiments, the liquid (liquid medium) can be one kind or two or more kinds selected from water, alcohols, ketones, and hydrocarbons.

Examples of alcohols to be suitably used can include chain aliphatic monohydric alcohols with 1 to 6 carbon atoms, cyclic aliphatic monohydric alcohols with 3 to 6 carbon atoms, and aromatic monohydric alcohols. Specific examples of those alcohols include ethanol, isopropyl alcohol, butyl alcohol, phenylethyl alcohol, propanol, and pentanol.

Examples of ketones to be suitably used can include chain aliphatic ketones with 3 to 6 carbon atoms, cyclic aliphatic ketones with 3 to 6 carbon atoms, and aromatic ketones with 8 to 10 carbon atoms. Specific examples of those ketones can include acetone, methyl ethyl ketone, methyl isobutyl ketone, cyclohexanone, and acetophenone.

Examples of hydrocarbons to be suitably used can include isoparaffin hydrocarbons, and specific examples thereof include an IP solvent.

In the case where the composition includes the liquid medium, the content of the liquid medium in the composition can vary according to its purpose, but may be preferably 20 mass % or more, more preferably 30 mass % or more, and even more preferably 40 mass % or more, as a total quantity.

The content of the liquid medium in the composition can be preferably 70 mass % or less, more preferably 60 mass % or less, and even more preferably 50 mass % or less.

In such a range, uniform dispersibility of the constituent materials of the composition can be enhanced, and the handleability can be enhanced.

6. MODIFIED EXAMPLES

(1) Modified Example 1

The personal care product manufactured using the manufacturing device 1 can be, as an example, a solid personal care product mainly containing powder, such as powder cosmetics like eye shadows or foundations containing cosmetic powders, but it is not limited to this. The manufacturing device 1 may manufacture a solid personal care product (e.g., lipstick, solid soap, cream eye shadow, aroma candle, or the like) whose main component is not powder. The manufacturing device 1 may manufacture a personal care product of a liquid (e.g., skin lotion, shampoo, or the like) or a particle body (bath additives or the like).

For example, the first machine 500 can perform, as the first operation, a process of supplying a composition to a workpiece (container). The second machine 600 can include, as the second operation, a process of supplying another composition to the workpiece (same container). Here, if the first machine 500 supplies a composition constituting a moisturizing type lotion and the second machine 600 supplies a composition constituting a whitening type lotion to a workpiece (container) at any ratio, it can be possible to manufacture lotions corresponding to various user preferences and various skin types.

(2) Modified Example 2

The stage 100 may further include a station for another application use. For example, the stage 100 may include one or more inspection stations at which a workpiece 700 after subjected to the first operation and/or the second operation can be inspected.

(3) Modified Example 3

The control device 300 may control the movement of the shuttle 200 such that the shuttle 200 moves from the supply station 110 to either the first operation station 113 or the second operation station 114, and after either the first operation or the second operation can be performed thereon, the shuttle 200 can move to the ejecting station 118.

In short, the manufacturing device 1 may form a personal care product having either the first sculpture or the second sculpture.

In the embodiment described above, the manufacturing device 1 can perform both the first operation and the second operation to manufacture a personal care product having a first sculpture or a second sculpture, but in parallel with this, may perform either the first operation or the second operation to manufacture a personal care product of a different type having a first sculpture or a second sculpture.

7. CONCLUSION

Typically, manufacturing of a personal care product may include a plurality of processes, and its manufacture line may need a wide space and many operators, and further, the cycle time may be prolonged.

In contrast to this, according to one or more embodiments of the present disclosure, a plurality of the stations 110 to 119 can be disposed not in a serially linear manner but in a two-dimensional manner so as to be capable of freely moving. This can make it possible for a plurality of the shuttles 200 to independently and freely move between a plurality of the stations 110 to 119 simultaneously and concurrently. In addition, the manufacturing of a personal care product including the plurality of processes can be made space-saving and manpower-saving and can shorten the cycle time.

According to one or more embodiments of the present disclosure, the first operation or the second operation that can be performed first is performed first, and the other operation is performed later, so that it can be possible, for instance, to prevent a plurality of shuttles from waiting for the operation in a predetermined order and the overall cycle time from being prolonged due to stagnation of the operation. Since a plurality of the shuttles 200 can freely move over the stage 100, and the target operations can be performed simultaneously and concurrently, the stagnation of the operation can be less likely to occur, unlike a serial line. Consequently, the overall cycle time when many personal care products are manufactured can be shortened.

According to one or more embodiments, the control device 300 can cause the first machine 500 and the second machine 600 to create a first sculpture having a different shape and a second sculpture having a different shape (to perform either a different first operation or a different second operation) on the basis of different NC programs. This may not require individual molds or the like when creating sculptures having various designs, and can make it possible to manufacture various types of personal care products with various designs if different NC programs are prepared.

If various types of NC programs are prepared, various types of personal care products can be manufactured, so that a personal care product of a type with a small number of lots can be easily manufactured at a low cost. For example, a service to easily manufacture an on-demand personal care product with a design desired by an orderer (such as an individual or a business operator) at a low cost can be easily achieved.

According to one or more embodiments, the stage 100, the first machine 500, and the second machine 600 can be physically independent. Further, the basic computer program for controlling the on/off and current values of the electromagnetic coils of the stage 100 to move the shuttle 200, and the NC programs using G-codes for controlling the first machine 500 and the second machine 600 as a subroutine of the basic computer program can be used. Thus, if the stage 100 and the basic program are prepared, a device including a device (3D printer) that includes a nozzle for forming a deposition and a carving machine (end mill or the like) that forms a carving, as the first machine 500 and the second machine 600, can be appropriately installed, and a computer program corresponding to the installed first machine 500 and second machine 600 can be executed, various types of personal care products having various designs can be easily manufactured by various manufacturing methods.

According to one or more embodiments, since a serial line facility may not be used and a mold may not be required, it can also be possible to simultaneously create various types of personal care products with various different designs. For example, it may be assumed that the first operation takes a relatively long time and the second operation takes a short time to create one type of personal care products. In this case, when the second operation is terminated early, a free time of the second machine 600 that performs the second operation can be generated. In this case, if another type of personal care product for which the second operation takes a long time and the first operation takes a short time (or still another type of personal care product on which only the second operation is to be performed) is manufactured simultaneously and concurrently with the one type of personal care product described above, the free time of the second machine 600 can be effectively utilized, and the overall cycle time can be shortened.

The embodiments and modified examples of the present technology have been described above, but the present technology is not limited to the embodiments described above and can be variously modified without departing from the gist of the present technology.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosed subject matter can also be as set forth according to the following parentheticals.

(1) A manufacturing system for manufacturing a personal care product applicable to one or more portions of a human body, the manufacturing system comprising: a stage including a plurality of stations; a shuttle to mount a workpiece thereon and to move between a plurality of the stations to transport the workpiece, the workpiece being a precursor of the personal care product; and a controller, wherein the plurality of stations includes: a supply station to which the workpiece is supplied, a plurality of operation stations at which operations are respectively performed on the workpiece, and an ejecting station from which the workpiece is ejected, and the controller controls movement of the shuttle by moving the shuttle to the supply station to mount the workpiece thereon, extracting operation stations for performing operations to the mounted workpiece from among the plurality of operation stations, selecting an operation station from a plurality of the operation stations in accordance with availability of the extracted operation stations and reversibility of an execution order of the operations, and moving the shuttle to the selected operation stations in sequence to perform the operations on the workpiece, then moving the shuttle to the ejecting station to eject the workpiece, and then moving the shuttle to the supply station again.

(2) The manufacturing system according to (1), wherein the manufacturing system comprises a plurality of the shuttles, and the controller controls movement of the plurality of the shuttles such that the plurality of the shuttles independently move between the plurality of stations.

(3) The manufacturing system according to (1) or (2), wherein the controller controls the movement of the plurality of the shuttles such that the operations are performed in parallel at the plurality of operation stations on the workpieces respectively mounted on the plurality of the shuttles.

(4) The manufacturing system according to any one of (1) to (3), wherein the plurality of operation stations have respective operation standby stations to wait after the operation, and the controller controls the movement of the plurality of the shuttles such that, when corresponding ones of the plurality of the shuttles waiting at the plurality of the operation standby stations have an identical subsequent destination station, priority is given to one of the plurality of shuttles to which the workpiece is supplied first.

(5) The manufacturing system according to any one of (1) to (4), wherein the controller controls the movement of the plurality of the shuttles such that paths from the plurality of the operation stations to the plurality of the operation standby stations, respectively, are one-way paths, and paths from the plurality of the operation standby stations to the plurality of the operation stations, respectively, are one-way paths.

(6) The manufacturing system according to any one of (1) to (5), wherein the controller determines, when one shuttle of the plurality of the shuttles starts to move from a departure station to a destination station, that the destination station is in use, and controls the movement of the plurality of the shuttles such that another shuttle does not start to move to the destination station determined as being in use.

(7) The manufacturing system according to any one of (1) to (6), wherein the controller determines, when one shuttle completes the movement from the departure station to the destination station, that the departure station is empty, and controls the movement of the plurality of the shuttles such that another shuttle starts to move to the departure station determined as being empty.

(8) The manufacturing system according to any one of (1) to (7), wherein the plurality of operation stations, the supply station, and the ejecting station are two-dimensionally disposed.

(9) The manufacturing system according to any one of (1) to (8), wherein the operation is performed with the workpiece mounted on the shuttle in at least one operation station of the plurality of the operation stations.

(10) The manufacturing system according to any one of (1) to (9), further comprising: an operating machine that performs the operation, wherein the controller controls the operating machine and/or the shuttle such that one of the plurality of the different operations is performed.

(11) The manufacturing system according to any one of (1) to (10), wherein the controller controls the movement of the shuttle not to pass any of the operation stations that is unnecessary to pass.

(12) The manufacturing system according to any one of (1) to (11), wherein the controller determines XYZ coordinates and rotational angles about XYZ axes on the stage over which the shuttle is located, on a basis of a result obtained a condition where the stage electromagnetically detects the shuttle.

(13) The manufacturing system according to any one of (1) to (12), wherein for detecting an increase in weight of the shuttle located at the supply station, the controller determines that the workpiece is supplied to the shuttle, and starts control for the shuttle to move to the operation station.

(14) The manufacturing system according to any one of (1) to (13), wherein for detecting a decrease in weight of the shuttle located at the ejecting station, the controller determines that the workpiece is ejected from the shuttle, and starts control for the shuttle to move to the supply station.

(15) The manufacturing system according to any one of (1) to (14), wherein the plurality of stations includes one or more inspection stations at which the workpiece after subjected to the operations is inspected.

(16) The manufacturing system according to any one of (1) to (15), wherein the operations performed at the plurality of the operation stations include two or more sculpture forming processes, and the two or more sculpture forming processes include at least one of a process of forming a carving on the workpiece, or a process of forming a deposition on the workpiece.

(17) The manufacturing system according to any one of (1) to (16), wherein the operations performed at the plurality of the operation stations include two or more sculpture forming processes, and the two or more sculpture forming processes are carving the workpiece including a base material therein or depositing a composition on the workpiece to form a sculpture from the base material, and the two or more sculpture forming processes include at least one of a carving forming process of carving the base material while moving at least one of a carving machine or the workpiece relative to another one, to form a carving as the sculpture, or a deposition forming process of moving, while supplying a composition from a nozzle to the workpiece, at least one of the nozzle or the workpiece relative to another one and depositing the composition on the base material, to form a deposition as the sculpture.

(18) The manufacturing system according to any one of (1) to (17), wherein the personal care product includes one or two or more selected from a cosmetic, an aroma candle, a detergent, and a bath additive.

(19) The manufacturing system according to any one of (1) to (18), wherein the stage and the shuttle constitute a linear transport system.

(20) The manufacturing system according to any one of (1) to (19), wherein a time taken for each of the plurality of the different operations is different.

(21) The manufacturing system according to any one of (1) to (20), wherein the sculpture forming processes include: setting a base material coordinate system in which a planar surface parallel to the stage is an XY plane, and any point on a base material surface is an origin, setting a local coordinate system in which a tip of the operating machine is an origin on a planar surface parallel to the XY plane, and moving at least one of the operating machine or the workpiece relative to another one such that the origin of the local coordinate system and the origin of the base material coordinate system coincide with each other, and then causing an NC program to operate in the local coordinate system, to form the sculpture.

(22) A manufacturing method for a personal care product applicable to one or more portions of a human body using a manufacturing system including: a stage including a plurality of stations, and a shuttle to mount a workpiece thereon and to move between a plurality of the stations to transport the workpiece, the workpiece being a precursor of the personal care product, wherein the plurality of stations includes: a supply station to which the workpiece is supplied, a plurality of operation stations at which respective operations are performed on the workpiece, and an ejecting station from which the workpiece is ejected, and the method comprises controlling movement of the shuttle by moving the shuttle to the supply station to mount the workpiece thereon, extracting operation stations for performing operations necessary for the mounted workpiece from among a plurality of the operation stations, selecting an operation station from the plurality of the operation stations in accordance with availability of the extracted operation stations and reversibility of an execution order of the operations, and moving the shuttle to the selected operation stations in sequence to perform the operations on the workpiece, then moving the shuttle to the ejecting station to eject the workpiece, and then moving the shuttle to the supply station again.

(23) A control device, which controls a manufacturing device for a personal care product applicable to a human body including a face, the manufacturing device including: a stage including a plurality of stations, and a shuttle to mount a workpiece thereon and to move between a plurality of the stations to transport the workpiece, the workpiece being a precursor of the personal care product, wherein the plurality of stations includes: a supply station to which the workpiece is supplied, a plurality of operation stations at which operations are performed on the workpiece, respectively, and an ejecting station from which the workpiece is ejected, and the method comprises controlling movement of the shuttle by moving the shuttle to the supply station to mount the workpiece thereon, extracting operation stations to perform operations for the mounted workpiece from among a plurality of the operation stations, selecting an operation station from the plurality of the operation stations in accordance with availability of the extracted operation stations and reversibility of an execution order of the operations, and moving the shuttle to the selected operation stations in sequence to perform the operations on the workpiece, then moving the shuttle to the ejecting station to eject the workpiece, and then moving the shuttle to the supply station again.

(24) A computer program, which is executable by a control device that controls a manufacturing device for a personal care product applicable to a human body including a face, the manufacturing device including: a stage including a plurality of stations, and a shuttle that mounts a workpiece thereon and moves between a plurality of the stations to transport the workpiece, which is a precursor of the personal care product, the plurality of stations including: a supply station to which the workpiece is supplied, a plurality of operation stations at which operations are performed on the workpiece, respectively, and an ejecting station from which the workpiece is ejected, wherein the computer program operates the control device to control movement of the shuttle by moving the shuttle to the supply station to mount the workpiece thereon, extracting operation stations for performing operations necessary for the mounted workpiece from a plurality of the operation stations, selecting an optimal operation station from a plurality of the operation stations in accordance with availability of the extracted operation stations and reversibility of an execution order of the operations, and moving the shuttle to the selected operation stations in sequence to perform the operations on the workpiece, then moving the shuttle to the ejecting station to eject the workpiece, and then moving the shuttle to the supply station again.

(25) A personal care product applicable to one or more portions of a human body, comprising: two or more sculptures formed of a deposition and/or a carving, wherein the sculptures are formed of two or more different shapes and/or compositions.

(26) A manufacturing method for a personal care product by using the manufacturing device according to any one of (1) to (21).

The invention claimed is:

1. A manufacturing system for manufacturing a personal care product applicable to one or more portions of a human body, the manufacturing system comprising:

a stage including a plurality of stations;

a shuttle to mount a workpiece thereon and to move between a plurality of the stations to transport the workpiece, the workpiece being a precursor of the personal care product; and a controller, wherein the plurality of stations includes:

a supply station to which the workpiece is supplied, a plurality of operation stations at which operations are respectively performed on the workpiece, and an ejecting station from which the workpiece is ejected, and the controller controls movement of the shuttle by moving the shuttle to the supply station to mount the workpiece thereon, extracting operation stations for performing operations to the mounted workpiece from among the plurality of operation stations, selecting an operation station from a plurality of the operation stations in accordance with availability of the extracted operation stations and reversibility of an execution order of the operations, and moving the shuttle to the selected operation stations in sequence to perform the operations on the workpiece, then moving the shuttle to the ejecting station to eject the workpiece, and then moving the shuttle to the supply station again, the manufacturing system comprises a plurality of the shuttles, the controller controls movement of the plurality of the shuttles such that the plurality of the shuttles independently move between the plurality of stations, the plurality of operation stations have respective operation standby stations to wait after the operation, the controller controls the movement of the plurality of the shuttles such that, when corresponding ones of the plurality of the shuttles waiting at the plurality of the operation standby stations have an identical subsequent destination station, priority is given to one of the plurality of shuttles to which the workpiece is supplied first, and the controller controls the movement of the plurality of the shuttles such that paths from the plurality of the operation stations to the plurality of the operation standby stations, respectively, are one-way paths, and paths from the plurality of the operation standby stations to the plurality of the operation stations, respectively, are one-way paths.

2. The manufacturing system according to claim 1, wherein the controller controls the movement of the plurality of the shuttles such that the operations are performed in parallel at the plurality of operation stations on the workpieces respectively mounted on the plurality of the shuttles.

3. The manufacturing system according to claim 1, wherein the controller determines, when one shuttle of the plurality of the shuttles starts to move from a departure station to a destination station, that the destination station is in use, and controls the movement of the plurality of the shuttles such that another shuttle does not start to move to the destination station determined as being in use.

4. The manufacturing system according to claim 1, wherein the controller determines, when one shuttle completes the movement from the departure station to the destination station, that the departure station is empty, and controls the movement of the plurality of the shuttles such that another shuttle starts to move to the departure station determined as being empty.

5. The manufacturing system according to claim 1, wherein the plurality of operation stations, the supply station, and the ejecting station are two-dimensionally disposed.

6. The manufacturing system according to claim 1, wherein the operation is performed with the workpiece mounted on the shuttle in at least one operation station of the plurality of the operation stations.

7. The manufacturing system according to claim 1, wherein the controller controls the movement of the shuttle not to pass any of the operation stations that are unnecessary to pass.

8. The manufacturing system according to claim 1, wherein the controller determines XYZ coordinates and rotational angles about XYZ axes on the stage over which the shuttle is located, on a basis of a result obtained a condition where the stage electromagnetically detects the shuttle.

9. The manufacturing system according to claim 1, wherein for detecting an increase in weight of the shuttle located at the supply station, the controller determines that the workpiece is supplied to the shuttle, and starts control for the shuttle to move to the operation station.

10. The manufacturing system according to claim 1, wherein for detecting a decrease in weight of the shuttle located at the ejecting station, the controller determines that the workpiece is ejected from the shuttle, and starts control for the shuttle to move to the supply station.

11. The manufacturing system according to claim 1, wherein the operations performed at the plurality of the operation stations include two or more sculpture forming processes, and the two or more sculpture forming processes include at least one of a process of forming a carving on the workpiece, or a process of forming a deposition on the workpiece.

12. The manufacturing system according to claim 1, wherein the operations performed at the plurality of the operation stations include two or more sculpture forming processes, and the two or more sculpture forming processes are carving the workpiece including a base material therein or depositing a composition on the workpiece to form a sculpture from the base material, and the two or more sculpture forming processes include at least one of a carving forming process of carving the base material while moving at least one of a carving machine or the workpiece relative to another one, to form a carving as the sculpture, or a deposition forming process of moving, while supplying a composition from a nozzle to the workpiece, at least one of the nozzle or the workpiece relative to another one and depositing the composition on the base material, to form a deposition as the sculpture.

13. The manufacturing system according to claim 1, wherein the personal care product includes one or two or more selected from a cosmetic, an aroma candle, a detergent, and a bath additive.

14. The manufacturing system according to claim 1, wherein the stage and the shuttle constitute a linear transport system.

15. The manufacturing system according to claim 1, wherein a time taken for each of the plurality of the different operations is different.

16. The manufacturing system according to claim 11, wherein the sculpture forming processes include:

setting a base material coordinate system in which a planar surface parallel to the stage is an XY plane, and any point on a base material surface is an origin, setting a local coordinate system in which a tip of the operating machine is an origin on a planar surface parallel to the XY plane, and moving at least one of the operating machine or the workpiece relative to another one such that the origin of the local coordinate system and the origin of the base material coordinate system coincide with each other, and then causing an NC program to operate in the local coordinate system, to form the sculpture.

17. A manufacturing method for a personal care product applicable to one or more portions of a human body using a manufacturing system including:

a stage including a plurality of stations, and a shuttle to mount a workpiece thereon and to move between a plurality of the stations to transport the workpiece, the workpiece being a precursor of the personal care product, wherein the plurality of stations includes:

a supply station to which the workpiece is supplied, a plurality of operation stations at which respective operations are performed on the workpiece, and an ejecting station from which the workpiece is ejected, and the method comprises controlling movement of the shuttle by moving the shuttle to the supply station to mount the workpiece thereon, extracting operation stations for performing operations necessary for the mounted workpiece from among a plurality of the operation stations, selecting an operation station from the plurality of the operation stations in accordance with availability of the extracted operation stations and reversibility of an execution order of the operations, and moving the shuttle to the selected operation stations in sequence to perform the operations on the workpiece, then moving the shuttle to the ejecting station to eject the workpiece, and then moving the shuttle to the supply station again, the manufacturing system comprises a plurality of the shuttles, the method controls movement of the plurality of the shuttles such that the plurality of the shuttles independently move between the plurality of stations, the plurality of operation stations have respective operation standby stations to wait after the operation, the method controls the movement of the plurality of the shuttles such that, when corresponding ones of the plurality of the shuttles waiting at the plurality of the operation standby stations have an identical subsequent destination station, priority is given to one of the plurality of shuttles to which the workpiece is supplied first, and the method controls the movement of the plurality of the shuttles such that paths from the plurality of the operation stations to the plurality of the operation standby stations, respectively, are one-way paths, and paths from the plurality of the operation standby stations to the plurality of the operation stations, respectively, are one-way paths.

18. A non-transitory computer-readable storage medium having stored thereon instructions that, when executed by one or more processors, causes the one or more processors to perform a method of controlling a manufacturing device for a personal care product applicable to one or more portions of a human body, the manufacturing device including:

a stage including a plurality of stations, and a shuttle to mount a workpiece thereon and to move between a plurality of the stations to transport the workpiece, the workpiece being a precursor of the personal care product, wherein the plurality of stations includes:

a supply station to which the workpiece is supplied, a plurality of operation stations at which operations are performed on the workpiece, respectively, and an ejecting station from which the workpiece is ejected, and the method comprises controlling movement of the shuttle by moving the shuttle to the supply station to mount the workpiece thereon, extracting operation stations to perform operations for the mounted workpiece from among a plurality of the operation stations, selecting an operation station from the plurality of the operation stations in accordance with availability of the extracted operation stations and reversibility of an execution order of the operations, and moving the shuttle to the selected operation stations in sequence to perform the operations on the workpiece, then moving the shuttle to the ejecting station to eject the workpiece, and then moving the shuttle to the supply station again, the manufacturing device comprises a plurality of the shuttles, the method controls movement of the plurality of the shuttles such that the plurality of the shuttles independently move between the plurality of stations, the plurality of operation stations have respective operation standby stations to wait after the operation, the method controls the movement of the plurality of the shuttles such that, when corresponding ones of the plurality of the shuttles waiting at the plurality of the operation standby stations have an identical subsequent destination station, priority is given to one of the plurality of shuttles to which the workpiece is supplied first, and the method controls the movement of the plurality of the shuttles such that paths from the plurality of the operation stations to the plurality of the operation standby stations, respectively, are one-way paths, and paths from the plurality of the operation standby stations to the plurality of the operation stations, respectively, are one-way paths.

* * * * *